United States Patent
Sekine

(10) Patent No.: US 9,291,798 B2
(45) Date of Patent: Mar. 22, 2016

(54) IMAGING LENS

(71) Applicant: KANTATSU CO., LTD., Yaita-shi, Tochigi (JP)

(72) Inventor: Yukio Sekine, Sukagawa (JP)

(73) Assignee: KANTATSU CO., LTD., Yaita-shi (JP)

(*) Notice: Subject to any disclaimer, the term of this patent is extended or adjusted under 35 U.S.C. 154(b) by 0 days.

(21) Appl. No.: 14/287,288

(22) Filed: May 27, 2014

(65) Prior Publication Data

US 2014/0355134 A1 Dec. 4, 2014

(30) Foreign Application Priority Data

May 31, 2013 (JP) .................................. 2013-116152
Feb. 26, 2014 (JP) .................................. 2014-035806

(51) Int. Cl.
| | |
|---|---|
| *G02B 13/18* | (2006.01) |
| *G02B 3/02* | (2006.01) |
| *G02B 9/00* | (2006.01) |
| *G02B 9/62* | (2006.01) |
| *G02B 13/00* | (2006.01) |
| *G02B 13/16* | (2006.01) |
| *G02B 3/04* | (2006.01) |
| *G02B 5/00* | (2006.01) |

(52) U.S. Cl.
CPC .............. *G02B 13/0045* (2013.01); *G02B 3/04* (2013.01); *G02B 5/005* (2013.01); *G02B 9/62* (2013.01); *G02B 13/002* (2013.01); *G02B 13/0015* (2013.01); *G02B 13/16* (2013.01); *G02B 13/18* (2013.01)

(58) Field of Classification Search
CPC ....... G02B 13/0045; G02B 9/62; G02B 13/18; G02B 13/0015; G02B 3/04; G02B 13/002; G02B 5/005; G02B 13/16
USPC .......................... 359/713, 739, 740, 756, 757
See application file for complete search history.

(56) References Cited

U.S. PATENT DOCUMENTS

| | | |
|---|---|---|
| 8,743,482 B1 | 6/2014 | Tsai et al. |
| 2012/0188654 A1 | 7/2012 | Huang |
| 2012/0243108 A1 | 9/2012 | Tsai et al. |
| 2014/0049843 A1 | 2/2014 | Kubota et al. |
| 2014/0071543 A1* | 3/2014 | Shinohara .................... 359/713 |
| 2014/0111876 A1 | 4/2014 | Tang et al. |
| 2014/0185150 A1 | 7/2014 | Shinohara et al. |

(Continued)

FOREIGN PATENT DOCUMENTS

| | | |
|---|---|---|
| JP | 2010-262270 A | 11/2010 |
| JP | 2012-155223 A | 8/2012 |

*Primary Examiner* — Evelyn A Lester
(74) *Attorney, Agent, or Firm* — Westerman, Hattori, Daniels & Adrian, LLP

(57) ABSTRACT

A compact high-resolution imaging lens which provides a wide field of view of 80 degrees or more and corrects various aberrations properly. Designed for a solid-state image sensor, the imaging lens includes constituent lenses arranged in the following order from an object side to an image side: a first positive (refractive power) lens having a convex object-side surface; a second negative lens having a concave image-side surface; a third positive lens as a double-sided aspheric lens having a convex object-side surface; a fourth positive lens having a convex image-side surface; a fifth lens as a double-sided aspheric lens having a concave image-side surface; and a sixth negative lens having a concave image-side surface. The image-side surface of the sixth lens has an aspheric shape with a pole-change point in a position off an optical axis.

20 Claims, 22 Drawing Sheets

(56) References Cited

U.S. PATENT DOCUMENTS

2014/0254029 A1 9/2014 Hsu et al.
2014/0320981 A1 10/2014 Hsieh et al.
2014/0327808 A1 11/2014 Chen et al.

* cited by examiner

IMAGING LENS

The present application is based on and claims priority of Japanese patent application No. 2013-116152 filed on May 31, 2013, and Japanese patent application No. 2014-035806 filed on Feb. 26, 2014, the entire contents of which are hereby incorporated by reference.

BACKGROUND OF THE INVENTION

1. Field of the Invention

The present invention relates to imaging lenses which form an image of an object on a solid-state image sensor such as a CCD sensor or a C-MOS sensor used in a compact image pickup device. More particularly, the invention relates to imaging lenses which are built in image pickup devices mounted in highly functional products such as smart TVs and 4K TVs, information terminals such as game consoles and PCs, and mobile terminals such as smart phones, mobile phones and PDAs (Personal Digital Assistants).

2. Description of the Related Art

In recent years, highly functional products, such as a smart TV as a TV with a personal computer function and a 4K TV as a TV with four times higher resolution than a full high-definition TV, have been attracting attention. In smart TVs, the tendency toward products which are not only highly functional but also multifunctional is growing, so the smart TV market is expected to expand in the future. Some smart TVs provide a function to take video and still images through a built-in image pickup device and transmit the images through a communication network. This function can be used in various application fields: for example, a video phone and a high-precision people meter based on face recognition technology, and other various products such as a security product and a pet monitoring product which have a moving object detection function. Also, due to its high resolution, a 4K TV can reproduce an image which is so realistic as if the object were there. With the spread of smart TVs or similar products, these functions are expected to be more popular than before. On the other hand, digital photo frames with a camera function have been recently introduced into the market. Thus, the market related to cameras is expected to expand.

In communications over a video phone, for example, in a TV conference in which several people participate, the facial expression of the speaker and the surrounding scene are important information. In addition, when face recognition technology is used to recognize the faces of human beings or animals, image recognition should be highly accurate. The imaging lens used in such a high resolution product is required to have a compact lens system which provides high resolution, a wide field of view and high brightness.

However, in the conventional techniques, it is difficult to meet this demand satisfactorily. For example, the image pickup device used in a highly functional product such as a smart TV is assumed to adopt a relatively large image sensor suitable for high resolution images. If a conventional imaging lens is used in a large image sensor, since its optical system should be large, the following problem arises that various aberrations become more serious and it is very difficult to deliver the same level of high optical performance as in a small image sensor. In addition, when the lens is designed to provide a wide field of view, correction of aberrations may be very difficult, particularly in the peripheral area, regardless of image sensor size and it may be impossible to deliver satisfactory optical performance.

As imaging lenses for use in an apparatus with an image pickup device, the imaging lenses described in Patent Document 1 to Patent Document 3 are known.

JP-A-2010-262270 (Patent Document 1) discloses an imaging lens which includes, in order from an object side, a first lens with positive refractive power having a convex shape on the object-side surface near an optical axis, a second lens with negative refractive power, a third lens with positive refractive power having a concave shape on an image-side surface near the optical axis, a fourth lens with positive refractive power having a convex shape on the image-side surface near the optical axis, and a fifth lens with negative refractive power near the optical axis. The imaging lens described in Patent Document 1 includes five constituent lenses, each of which is optimized to deliver high performance.

JP-A-2012-155223 (Patent Document 2) discloses an imaging lens which includes, in order from an object side, a first lens group with positive refractive power, a second lens group with negative refractive power, a third lens group with positive refractive power, a fourth lens group with negative refractive power, a fifth lens group with positive refractive power, and a sixth lens group with negative refractive power. In the imaging lens described in Patent Document 2, the lens configuration of the optical system is concentric with an aperture stop so as to suppress astigmatism and coma aberrations and provide a wider field of view.

US 2012/0188654 A1 (Patent Document 3) discloses an imaging lens which includes, in order from an object side, a first lens with positive refractive power having a convex surface on the object side, a second lens, a third lens, a fourth lens, a fifth lens, and a sixth lens as a double-sided aspheric lens having a concave surface on an image side, in which the sixth lens has at least one pole-change point on its image-side surface. The imaging lens described in Patent Document 3 is proposed as a compact imaging lens in which the sum of the refractive powers of the fifth lens and the sixth lens in the overall optical system is within an adequate range to ensure low manufacturing error sensitivity and sufficient telecentricity.

The imaging lens described in Patent Document 1 has a lens system which provides high brightness with an F-value of 2.0 and a relatively wide field of view with a half field of view of about 38 degrees. However, it cannot meet the recent demand for a wider field of view. Also, for use in a large image sensor, various aberrations must be further suppressed. However, if an imaging lens uses five constituent lenses, its ability to correct aberrations is limited and it is difficult to apply the imaging lens to a higher resolution apparatus as mentioned above.

The imaging lens described in Patent Document 2 provides relatively high brightness with an F-value of about 2.3 and can correct aberrations properly. However, its half field of view is about 33 degrees, which means that it cannot meet the demand for a wide field of view satisfactorily. Also, if the lens configuration described in Patent Document 2 is employed to provide a wide field of view, correction of aberrations will be difficult, particularly in the peripheral area and high optical performance cannot be delivered.

The imaging lens described in Patent Document 3 includes six constituent lenses and corrects aberrations properly, offering a relatively compact lens system. Its half field of view is relatively wide at about 37 degrees. However, the F-value is in the range from 2.8 to 3.2, suggesting that its brightness is not sufficient. In this imaging lens, it is difficult to address the problem of aberrations in the peripheral area so as to achieve a low F-value and a half field of view of 40 degrees or more.

As mentioned above, in the conventional techniques, it is difficult to provide a sufficiently wide field of view while ensuring compactness, and meet the demand for brightness and high resolution. Also, for use in a large image sensor, it is difficult to deliver the same level of high optical performance as in a conventional small image sensor.

SUMMARY OF THE INVENTION

The present invention has been made in view of the above problem and an object thereof is to provide a high-brightness compact imaging lens which delivers higher optical performance than conventional imaging lenses, provides a wide field of view and can correct various aberrations properly when it is used not only in a conventional small image sensor but also in a large image sensor.

Here, a "compact" imaging lens means an imaging lens in which the total track length is shorter than the length of the diagonal of the effective image plane of the image sensor and a "wide field of view" refers to a field of view of 80 degrees or more. The length of the diagonal of the effective image plane of the image sensor is considered to be the same as the diameter of the effective image circle whose radius is the maximum image height, namely the vertical height from an optical axis to the position where a light ray incident on the imaging lens at a maximum field of view enters the image plane.

According to one aspect of the present invention, there is provided an imaging lens for a solid-state image sensor in which constituent lenses are arranged in the following order from an object side to an image side: a first lens with positive refractive power having a convex surface on the object side; a second lens with negative refractive power having a concave surface on the image side; a third lens with positive refractive power as a double-sided aspheric lens having a convex surface on the object side; a fourth lens with positive refractive power having a convex surface on the image side; a fifth lens as a double-sided aspheric lens having a concave surface on the image side; and a sixth lens with negative refractive power having a concave surface on the image side. The image-side surface of the sixth lens has an aspheric shape with a pole-change point in a position off the optical axis.

In the imaging lens with the above configuration, it is possible to provide a focal length to increase the value of ih/f (to 0.87 or more) while suppressing aberrations. In fact, the values of ih/f are 0.87 to 1.04. On the other hand, the values of ih/f in Patent Document 2 are 0.65 to 0.71 and those in Patent Document 3 are 0.60 to 0.74. ih denotes a maximum image height and f denotes the focal length of the overall optical system of the imaging lens. ih and f are parameters which determine the field of view.

The above imaging lens is a telephoto lens which includes a lens group with composite positive refractive power composed of the first, second, third, and fourth lenses and a lens group with composite negative refractive power composed of the fifth and sixth lenses in order to achieve a short total track length.

The first lens is a lens with positive refractive power having a convex surface on the object side and its refractive power is relatively strong among the constituent lenses of the imaging lens. It has a biconvex shape in which the curvature radius of the object-side surface is smaller than the curvature radius of the image-side surface, and its positive refractive power is adequately distributed to the both surfaces so as to suppress spherical aberrations and provide relatively strong refractive power for compactness of the imaging lens. Alternatively, the image-side surface of the first lens may be concave and in that case, it is desirable that the curvature radius of the image-side surface be larger than the curvature radius of the object-side surface to the extent that the refractive power is not too low and spherical aberrations do not increase.

The second lens is a lens with negative refractive power having a concave surface on the image side which corrects spherical aberrations and chromatic aberrations properly.

The third lens is a lens having a convex surface on the object side with relatively weak positive refractive power among the constituent lenses of the imaging lens. It gives additional positive refractive power to the overall optical system of the imaging lens, thereby contributing to a shorter overall focal length and a wider field of view. Also, due to its aspheric surfaces on the both sides, it mainly corrects astigmatism and coma aberrations properly.

The fourth lens is a lens with positive refractive power having a convex surface on the image side, and its positive refractive power is relatively strong among the constituent lenses of the imaging lens. Its refractive power is balanced with the positive refractive power of the first lens, contributing to the compactness of the imaging lens.

The fifth lens is a double-sided aspheric lens having a concave surface on the image side, and due to the aspheric surfaces on the both sides, it properly corrects chromatic aberrations which occur on the third and fourth lenses and contributes to high resolution.

The sixth lens is a lens with negative refractive power having a concave surface on the image side, making it easy to ensure an adequate back focus. Due to the aspheric image-side surface with a pole-change point in a position off the optical axis, the negative refractive power of the image-side surface gradually decreases and changes to positive refractive power in the lens peripheral portion. This aspheric shape is effective mainly in correcting distortion and field curvature and controlling the angle of a light ray incident on the image sensor.

As for lens surface shapes, the terms "convex surface" and "concave surface" are used to express the shape of a paraxial surface (surface near the optical axis). A "pole-change point" here means a point on an aspheric surface at which a tangential plane intersects the optical axis perpendicularly.

Preferably, in the imaging lens according to the present invention, the fifth lens is a meniscus lens with negative refractive power having a concave surface on the image side in which each of the object-side surface and the image-side surface has an aspheric shape with a pole-change point in a position off the optical axis.

Since the fifth lens has negative refractive power, it can properly correct spherical aberrations and chromatic aberrations which occur on the third and fourth lenses. Among the six constituent lenses, the presence of the fifth lens with negative refractive power in addition to the second lens with negative refractive power makes it easy to correct spherical aberrations and chromatic aberrations properly. Since the fifth lens is a meniscus lens having a convex surface on the image side and each of its object-side and image-side surfaces has an aspheric shape with a pole-change point in a position off the optical axis, it can correct astigmatism and coma aberrations properly and improve off-axial optical performance and control the angle of a light ray incident on the image sensor. Such aspheric surfaces of the fifth lens make it easy to make the normal line angle of the aspheric shape of the peripheral portion of the sixth lens, located nearest to the image plane, an obtuse angle. This is effective in lowering manufacturing error sensitivity of the sixth lens and suppressing ghost phenomena caused by internal reflection of the sixth lens.

Preferably, in the imaging lens according to the present invention, the sixth lens is a meniscus lens having a concave surface on the image side in which the object-side surface has an aspheric shape with a pole-change point in a position off the optical axis.

Since the sixth lens is a meniscus lens having a concave surface on the image side and its object-side surface also has an aspheric shape with a pole-change point in a position off the optical axis, it can perform final correction of field curvature and final control of the angle of a light ray incident on the image sensor without impairing the above-mentioned aberration correction effect of the fifth lens. In order to ensure compactness, it is desirable that the aspheric surface be so shaped as to keep the change in the amount of sag small.

Alternatively, the fifth lens may have positive refractive power. In that case, if the positive refractive power of the fifth lens is weak so that the composite refractive power of the fifth and sixth lenses is negative and positive refractive power is adequately distributed among the first, third, and fourth lenses, it will be easier to shorten the total track length while suppressing various aberrations.

Preferably, the imaging lens according to the present invention satisfies a conditional expression (1) below:

$$0.55 < f1/f < 1.7 \quad (1)$$

where f denotes the focal length of the overall optical system of the imaging lens, and f1 denotes the focal length of the first lens.

The conditional expression (1) defines an adequate range for the ratio of the focal length of the first lens to the focal length of the overall optical system of the imaging lens and indicates a condition to achieve compactness of the imaging lens and correct spherical aberrations and coma aberrations properly. If the value is above the upper limit of the conditional expression (1), the positive refractive power of the first lens would be too weak to achieve compactness of the imaging lens. On the other hand, if the value is below the lower limit of the conditional expression (1), the positive refractive power of the first lens would be too strong to correct spherical aberrations and coma aberrations properly.

Preferably, the imaging lens according to the present invention satisfies a conditional expression (2) below:

$$-2.3 < f2/f < -0.8 \quad (2)$$

where f denotes the focal length of the overall optical system of the imaging lens, and f2 denotes the focal length of the second lens.

The conditional expression (2) defines an adequate range for the ratio of the focal length of the second lens to the focal length of the overall optical system of the imaging lens and indicates a condition to achieve compactness of the imaging lens and correct chromatic aberrations properly. If the value is above the upper limit of the conditional expression (2), the negative refractive power of the second lens would be too strong to achieve compactness of the imaging lens. Also, axial and off-axial chromatic aberrations would be excessively corrected (chromatic aberration at short wavelengths increases in the positive direction with respect to chromatic aberration at the reference wavelength), making it difficult to deliver high imaging performance. On the other hand, if the value is below the lower limit of the conditional expression (2), the negative refractive power of the second lens would be too weak to correct axial and off-axial chromatic aberrations properly (chromatic aberration at short wavelengths increases in the negative direction with respect to chromatic aberration at the reference wavelength). In this case as well, it would be difficult to deliver high imaging performance.

Preferably, the imaging lens according to the present invention satisfies conditional expressions (3) and (4) below:

$$45 < vd1 < 80 \quad (3)$$

$$20 < vd2 < 40 \quad (4)$$

where vd1 denotes the Abbe number of the first lens at d-ray, and vd2 denotes the Abbe number of the second lens at d-ray.

The conditional expressions (3) and (4) define adequate ranges for the Abbe numbers of the first and second lenses respectively and indicate conditions to correct chromatic aberrations properly. If the value is below the lower limit of the conditional expression (3) or the value is above the upper limit of the conditional expression (4), the difference in dispersion value between the first and second lenses would be smaller, making it impossible to correct chromatic aberrations properly. If the value is above the upper limit of the conditional expression (3) or the value is below the lower limit of the conditional expression (4), the balance between axial chromatic aberration and chromatic aberration of magnification would worsen, resulting in deterioration in optical performance in the peripheral portion.

Preferably, the imaging lens according to the present invention satisfies conditional expressions (5) to (8) below:

$$50 < vd3 < 75 \quad (5)$$

$$50 < vd4 < 75 \quad (6)$$

$$20 < vd5 < 40 \quad (7)$$

$$50 < vd6 < 75 \quad (8)$$

where vd3 denotes the Abbe number of the third lens at d-ray, vd4 denotes the Abbe number of the fourth lens at d-ray, vd5 denotes the Abbe number of the fifth lens at d-ray, and vd6 denotes the Abbe number of the sixth lens at d-ray.

The conditional expressions (5), (6), (7) and (8) define adequate ranges for the Abbe numbers of the third, fourth, fifth, and sixth lenses respectively and indicate conditions to correct chromatic aberrations properly. These conditional expressions suggest that the third, fourth, and sixth lenses are made of low-dispersion material and the fifth lens is made of high-dispersion material. The lenses of low-dispersion material and the lens of high-dispersion material are alternately arranged so that axial chromatic aberrations and chromatic aberrations of magnification can be corrected more properly.

Preferably, the imaging lens according to the present invention satisfies a conditional expression (10) below:

$$TTL/f < 1.6 \quad (10)$$

where f denotes the focal length of the overall optical system of the imaging lens, and TTL denotes the distance on the optical axis from the object-side surface of an optical element located nearest to the object to the image plane without a filter, etc.

The conditional expression (10) indicates a condition to make the imaging lens compact. If the value is above the upper limit of the conditional expression (10), the image-side principal point of the imaging lens would shift toward the object too much and the total track length would become too long, making it difficult to achieve compactness.

Preferably, the imaging lens according to the present invention satisfies a conditional expression (9) below:

$$0.65 < \Sigma d/TTL < 0.90 \quad (9)$$

where Σd denotes the distance on the optical axis from the object-side surface of the first lens to the image-side surface of the sixth lens, and TTL denotes the distance on the optical axis from the object-side surface of an optical element located nearest to the object to the image plane without a filter, etc.

The conditional expression (9) indicates a condition to shorten the total track length and correct aberrations properly. If the value is above the upper limit of the conditional expression (9), the back focus would be too short and it would be difficult to obtain space for a filter or the like and also it would be difficult to control the angle of a light ray incident on the image sensor within an adequate range. On the other hand, if the value is below the lower limit of the conditional expression (9), it would be difficult for each constituent lens of the imaging lens to have the required thickness. In addition, the distance between constituent lenses would be smaller, which might restrict the freedom of aspheric shape design. As a consequence, it would be difficult to deliver high optical performance.

Preferably, the imaging lens according to the present invention satisfies a conditional expression (11) below:

$$0.8 < ih/f < 1.2 \quad (11)$$

where f denotes the focal length of the overall optical system of the imaging lens, and ih denotes the maximum image height.

The conditional expression (11) defines an adequate range for the ratio of maximum image height to the focal length of the overall optical system of the imaging lens and indicates a condition to provide a wide field of view and deliver high imaging performance. If the value is above the upper limit of the conditional expression (11), the field of view would be too wide to correct aberrations in the peripheral portion properly, leading to deterioration in optical performance, particularly in the peripheral area of the image. On the other hand, if the value is below the lower limit of the conditional expression (11), the focal length of the overall optical system of the imaging lens would be too long to achieve compactness, offering a disadvantage in providing a wide field of view.

Preferably, the imaging lens according to the present invention satisfies a conditional expression (12) below:

$$1.3 < f3/f < 7.0 \quad (12)$$

where f3 denotes the focal length of the third lens, and f denotes the focal length of the overall optical system of the imaging lens.

The conditional expression (12) defines an adequate range for the ratio of the focal length of the third lens to the focal length of the overall optical system of the imaging lens, and indicates a condition to achieve compactness and correct various aberrations properly. If the value is above the upper limit of the conditional expression (12), the positive refractive power of the third lens would be too weak to provide a wide field of view. On the other hand, if the value is below the lower limit of the conditional expression (12), the positive refractive power of the third lens would be too strong to correct spherical aberrations, though a wide field of view and compactness may be achieved easily. When the conditional expression (12) is satisfied, the balance of the distribution of positive refractive power in the overall optical system and the balance of the aberration correction can be achieved easily.

Preferably, the imaging lens according to the present invention satisfies conditional expressions (13) and (14) below:

$$0.5 < f1234/f < 7.5 \quad (13)$$

$$-1.2 < f56/f < -0.5 \quad (14)$$

where f1234 denotes the composite focal length of the first to fourth lenses, f56 denotes the composite focal length of the fifth and sixth lenses, and f denotes the focal length of the overall optical system of the imaging lens.

The conditional expression (13) defines an adequate range for the ratio of the composite positive focal length of the first to fourth lenses to the focal length of the overall optical system of the imaging lens, and the conditional expression (14) defines an adequate range for the ratio of the composite negative focal length of the fifth and sixth lenses to the focal length of the overall optical system of the imaging lens. When these conditional expressions are satisfied, the telephoto ability is enhanced and increase in total track length is prevented.

DETAILED DESCRIPTION OF THE PREFERRED EMBODIMENTS

Hereinafter, the preferred embodiment of the present invention will be described in detail referring to the accompanying drawings.

FIGS. 1, 3, 5, 7, 9, 11, 13, 15, 17, 19, and 21 are schematic views showing the general configurations of the imaging lenses according to Examples 1 to 11 of this embodiment respectively. Since all these examples have the same basic configuration, the general configuration of an imaging lens according to this embodiment is explained below referring to the schematic view of Example 1.

Figure 1:
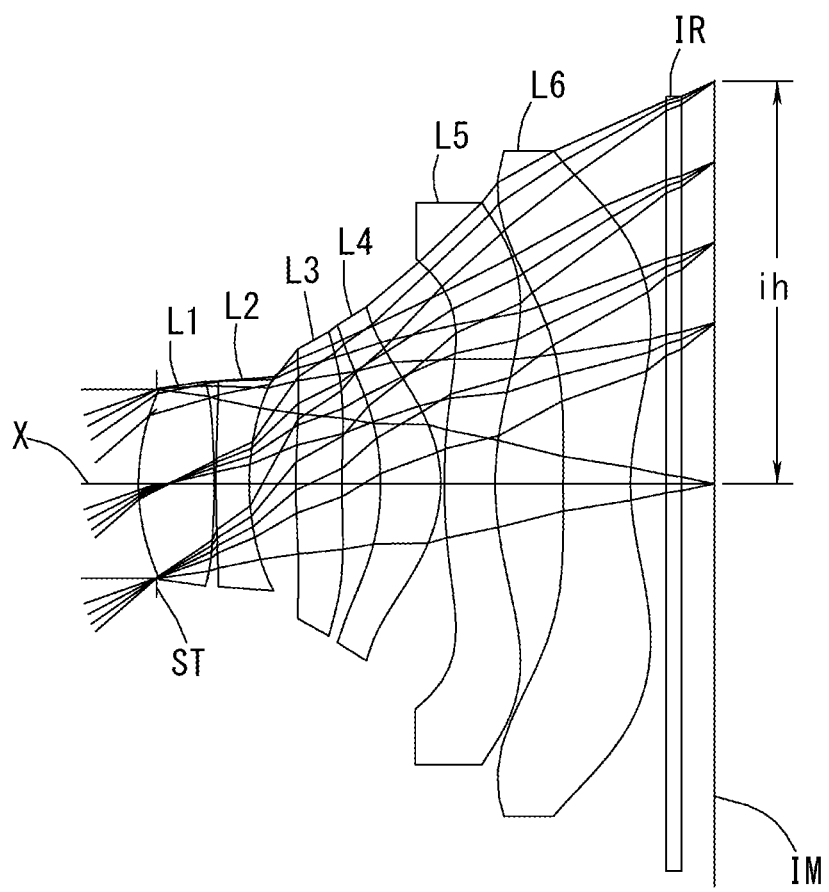
FIG. 1 is a schematic view showing the general configuration of an imaging lens in Example 1.

As shown in FIG. 1, the imaging lens according to this embodiment includes an aperture stop ST, a first lens L1 with positive refractive power, a second lens L2 with negative refractive power, a third lens L3 with positive refractive power, a fourth lens L4 with positive refractive power, a fifth lens L5 with negative refractive power, and a sixth lens L6 with negative refractive power which are arranged in order from an object side to an image side.

A filter IR is located between the sixth lens L6 and an image plane IM. This filter IR is omissible.

In the above imaging lens composed of six constituent lenses, the first lens L1 is a biconvex lens in which the object-side surface and image-side surface are both convex. The first lens L1 has only to have a convex object-side surface, and thus it may have a concave image-side surface. In Examples 8 and 11, the first lens L1 is a meniscus lens with a convex object-side surface.

The second lens L2 is a meniscus lens in which the object-side surface is convex and the image-side surface is concave. The second lens L2 has only to have a concave image-side surface, and thus it may have a concave object-side surface. In Example 8, the second lens L2 is a biconcave lens.

The third lens L3 is a meniscus lens in which the object-side surface is convex and the image-side surface is concave. The third lens L3 has only to have weak positive refractive power to correct aberrations and provide a wide field of view, and is thus not limited to the above shape. In Examples 5 to 9 and Example 11, the third lens L3 is a biconvex lens.

The fourth lens L4 is a meniscus lens having positive refractive power, in which the object-side surface is concave and the image-side surface is convex. The both surfaces of the fourth lens L4 have such an aspheric shape that the positive refractive power decreases toward the lens peripheral portion. Due to the weak positive refractive power in the peripheral portion, the lens mainly corrects astigmatism and field curvature properly.

The fifth lens L5 is a meniscus lens in which the object-side surface is convex and the image-side surface is concave. The object-side surface and image-side surface have an aspheric shape with a pole-change point in a position off the optical axis X. The refractive power of the fifth lens L5 should be such that the composite refractive power of the fifth lens L5 and the sixth lens L6 is negative. Therefore, for example, it may have weak positive refractive power. In Example 9, the fifth lens L5 has positive refractive power. The shape of the fifth lens L5 is not limited to a meniscus shape, and instead it may be a biconcave lens as shown in Example 10.

The sixth lens L6 is a meniscus lens in which the object-side surface is convex and the image-side surface is concave. The object-side surface and the image-side surface have an aspheric shape with a pole-change point in a position off the optical axis X. The lens is shaped so that it has negative refractive power near the optical axis X and the negative refractive power gradually decreases and changes to positive refractive power in the peripheral portion. The shape of the sixth lens L6 is not limited to a meniscus shape, and instead it may be a biconcave lens as shown in Example 9.

In the imaging lens according to this embodiment, the first lens L1, the second lens L2, the third lens L3, the fourth lens L4, the fifth lens L5, and the sixth lens L6 are all made of plastic material so that the manufacturing process is simplified and the imaging lens can be mass-produced at low cost.

All the constituent lenses have adequate aspheric surfaces on both the object and image sides to correct various aberrations more properly.

The material of the lenses is not limited to plastic material. Glass material may be used to achieve higher performance. It is preferable that all the lens surfaces be aspheric. However, according to the required performance, the lens surface may be spherical from the viewpoint of manufacturing ease.

The imaging lens according to this embodiment brings about favorable effects when it satisfies the following conditional expressions (1) to (14):

$$0.55 < f1/f < 1.7 \tag{1}$$

$$-2.3 < f2/f < -0.8 \tag{2}$$

$$45 < vd1 < 80 \tag{3}$$

$$20 < vd2 < 40 \tag{4}$$

$$50 < vd3 < 75 \tag{5}$$

$$50 < vd4 < 75 \tag{6}$$

$$20 < vd5 < 40 \tag{7}$$

$$50 < vd6 < 75 \tag{8}$$

$$0.65 < \Sigma d/TTL < 0.90 \tag{9}$$

$$TTL/f < 1.6 \tag{10}$$

$$0.8 < ih/f < 1.2 \tag{11}$$

$$1.3 < f3/f < 7.0 \tag{12}$$

$$0.5 < f1234/f < 7.5 \tag{13}$$

$$-1.2 < f56/f < -0.5 \tag{14}$$

where
f: focal length of the overall optical system of the imaging lens
f1: focal length of the first lens L1
f2: focal length of the second lens L2
f3: focal length of the third lens L3
vd1: Abbe number of the first lens L1 at d-ray
vd2: Abbe number of the second lens L2 at d-ray
vd3: Abbe number of the third lens L3 at d-ray
vd4: Abbe number of the fourth lens L4 at d-ray
vd5: Abbe number of the fifth lens L5 at d-ray
vd6: Abbe number of the sixth lens L6 at d-ray
TTL: distance on the optical axis X from the object-side surface of an optical element located nearest to the object to the image plane IM without the filter IR, etc.
$\Sigma d$: distance on the optical axis X from the object-side surface of the first lens L1 to the image-side surface of the sixth lens L6
ih: maximum image height
f1234: composite focal length of the first lens L1 to the fourth lens L4
f56: composite focal length of the fifth lens L5 and the sixth lens L6.

The imaging lens according to this embodiment brings about more favorable effects when it satisfies the following conditional expressions (1a) to (14a):

$$0.6 < f1/f < 1.5 \tag{1a}$$

$$-2.1 < f2/f < -0.9 \tag{2a}$$

$45 < vd1 < 70$  (3a)

$20 < vd2 < 30$  (4a)

$50 < vd3 < 65$  (5a)

$50 < vd4 < 65$  (6a)

$20 < vd5 < 30$  (7a)

$50 < vd6 < 65$  (8a)

$0.70 < \Sigma d/TTL < 0.90$  (9a)

$TTL/f < 1.55$  (10a)

$0.8 < ih/f < 1.1$  (11a)

$1.4 < f3/f < 6.4$  (12a)

$0.6 < f1234/f < 7.0$  (13a)

$-1.0 < f56/f < -0.5$  (14a)

The signs in the conditional expressions are the same as described in the preceding paragraph.

The imaging lens according to this embodiment brings about further more favorable effects when it satisfies the following conditional expressions (1b) to (14b):

$0.71 \le f1/f \le 1.42$  (1b)

$-1.9 \le f2/f \le -1.07$  (2b)

$50 < vd1 < 70$  (3b)

$22 < vd2 < 28$  (4b)

$53 < vd3 < 60$  (5b)

$53 < vd4 < 60$  (6b)

$22 < vd5 < 28$  (7b)

$50 < vd6 < 60$  (8b)

$0.76 \le \Sigma d/TTL \le 0.86$  (9b)

$TTL/f \le 1.43$  (10b)

$0.87 \le ih/f \le 1.04$  (11b)

$1.59 \le f3/f \le 5.83$  (12b)

$0.67 \le f1234/f \le 6.29$  (13b)

$-0.94 \le f56/f \le -0.63$  (14b)

The signs in the conditional expressions are the same as described in the preceding paragraph.

In this embodiment, the aspheric shapes of the aspheric lens surfaces are expressed by the following equation 1, where Z denotes an axis in the optical axis direction, H denotes a height perpendicular to the optical axis, k denotes a conic constant, and A4, A6, A8, A10, A12, A14, and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$   Equation 1

Next, the imaging lenses in examples according to this embodiment will be explained. In each example, f denotes the focal length of the overall optical system of the imaging lens, Fno denotes an F-number, ω denotes a half field of view, and ih denotes a maximum image height. i denotes a surface number counted from the object side, r denotes a curvature radius, d denotes the distance between lens surfaces on the optical axis X (surface distance), Nd denotes a refractive index at d-ray (reference wavelength), and vd denotes an Abbe number at d-ray. As for aspheric surfaces, an asterisk (*) after surface number i indicates that the surface concerned is an aspheric surface.

Example 1

The basic lens data of Example 1 is shown below in Table 1.

TABLE 1

| Example 1 |
| --- |
| in mm |
| f = 8.881<br>Fno = 2.40<br>ω(°) = 41.3<br>ih = 7.902 |

Surface Data

| Surface No. i | Curvature Radius r | Surface Distance d | Refractive Index Nd | Abbe Number vd |
| --- | --- | --- | --- | --- |
| (Object Surface) | Infinity | Infinity | | |
| 1 (Stop) | Infinity | −0.355 | | |
| 2* | 4.275 | 1.484 | 1.5438 | 55.57 |
| 3* | −15.055 | 0.040 | | |
| 4* | 46.740 | 0.650 | 1.6142 | 25.58 |
| 5* | 5.159 | 0.913 | | |
| 6* | 13.263 | 0.909 | 1.5346 | 56.16 |
| 7* | 24.871 | 0.751 | | |
| 8* | −5.600 | 1.182 | 1.5346 | 56.16 |
| 9* | −2.670 | 0.070 | | |

TABLE 1-continued

| Example 1 | | | | |
|---|---|---|---|---|
| 10* | 12.443 | 1.000 | 1.6142 | 25.58 |
| 11* | 6.123 | 1.330 | | |
| 12* | 81.918 | 1.325 | 1.5346 | 56.16 |
| 13* | 4.725 | 0.600 | | |
| 14 | Infinity | 0.300 | 1.5670 | 37.80 |
| 15 | Infinity | 0.746 | | |
| Image Plane | Infinity | | | |

Constituent Lens Data

| Lens | Start Surface | Focal Length |
|---|---|---|
| 1 | 2 | 6.293 |
| 2 | 4 | −9.498 |
| 3 | 6 | 51.739 |
| 4 | 8 | 8.369 |
| 5 | 10 | −20.885 |
| 6 | 12 | −9.435 |

Composite Focal Length

| f1234 | 55.88 |
|---|---|
| f56 | −6.17 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −7.869E−04 | 7.232E−03 | 4.714E−03 | −2.930E−03 | −8.477E−03 | −7.907E−03 |
| A6 | −2.818E−04 | −2.373E−03 | −2.894E−03 | 2.261E−03 | 6.556E−04 | 1.565E−04 |
| A8 | 4.033E−05 | −1.980E−04 | −6.140E−04 | −4.693E−04 | −5.132E−05 | 1.343E−06 |
| A10 | −2.350E−05 | 4.933E−05 | 9.916E−05 | 4.284E−05 | 5.286E−06 | 1.241E−06 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.767E+00 | 0.000E+00 | 0.000E+00 | 0.000E+00 | −8.787E+00 |
| A4 | −7.308E−03 | −7.899E−03 | 1.061E−03 | −3.841E−03 | −5.323E−03 | −3.454E−03 |
| A6 | 1.093E−03 | 6.571E−04 | −4.490E−04 | −2.241E−05 | 1.227E−04 | 7.714E−05 |
| A8 | 1.485E−05 | 3.600E−05 | 2.227E−05 | 6.595E−07 | 1.826E−06 | −2.206E−06 |
| A10 | −4.030E−06 | −1.909E−06 | −1.009E−06 | 1.180E−09 | −7.680E−08 | 4.482E−08 |
| A12 | 0.000E+00 | −1.356E−07 | 2.131E−08 | −2.170E−10 | 6.370E−10 | −4.674E−10 |
| A14 | 0.000E+00 | 5.080E−09 | 0.000E+00 | 1.563E−12 | −4.811E−12 | 2.973E−12 |
| A16 | 0.000E+00 | 0.000E+00 | 0.000E+00 | 0.000E+00 | 8.557E−14 | 0.000E+00 |

As shown in Table 12, the imaging lens in Example 1 satisfies all the conditional expressions (1) to (14).

Figure 2:
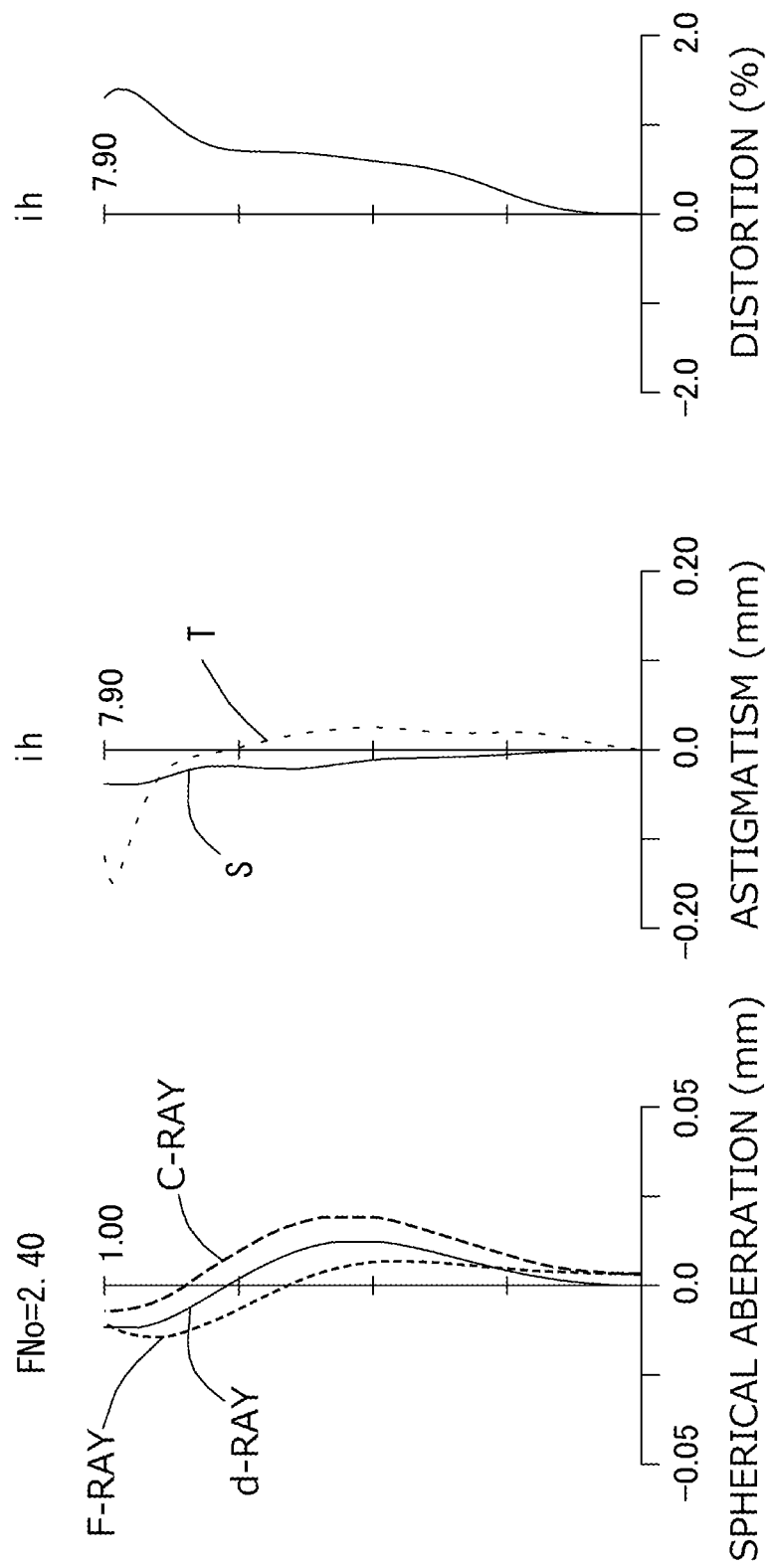
FIG. 2 shows spherical aberration, astigmatism, and distortion of the imaging lens in Example 1.
Figure 3:
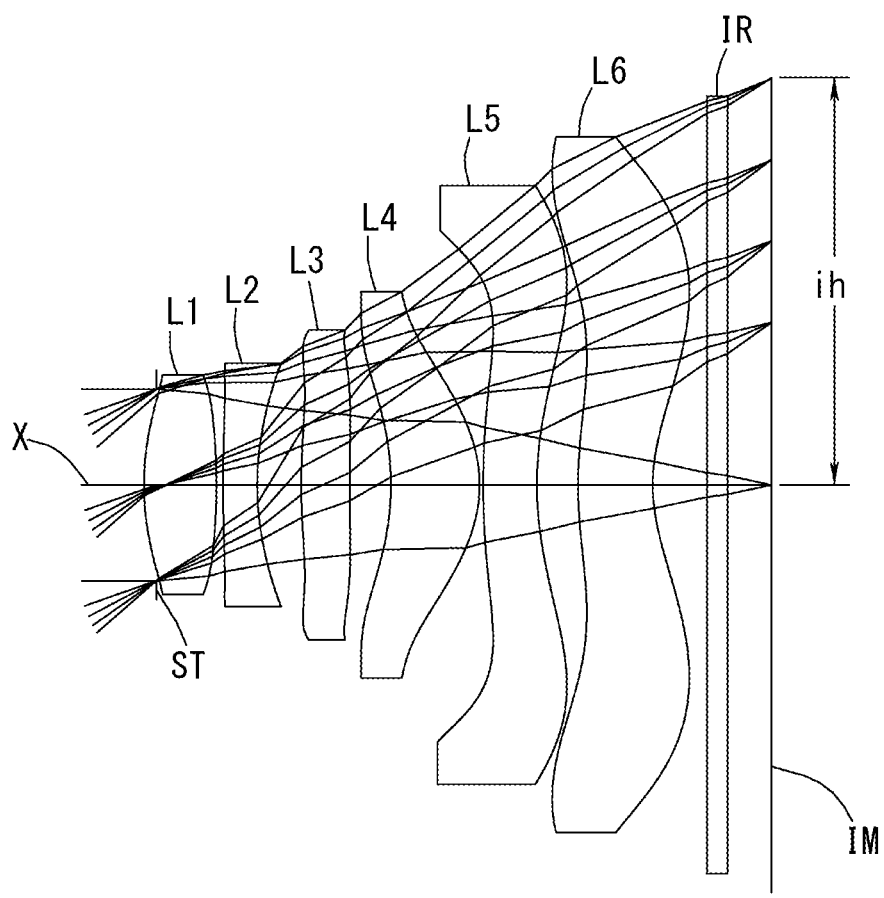
FIG. 3 is a schematic view showing the general configuration of an imaging lens in Example 2.

FIG. 2 shows spherical aberration (mm), astigmatism (mm), and distortion (%) of the imaging lens in Example 1. The spherical aberration diagram shows the amount of aberration at wavelengths of F-ray (486 nm), d-ray (588 nm), and C-ray (656 nm). The astigmatism diagram shows the amount of aberration on sagittal image surface S and the amount of aberration on tangential image surface T (the same is true for FIGS. 4, 6, 8, 10, 12, 14, 16, 18, 20, and 22). As shown in FIG. 2, each aberration is properly corrected.

The imaging lens provides a wide field of view of about 80 degrees and high brightness with an F-value of about 2.4. The ratio of total track length TTL to maximum image height ih (TTL/2ih) is 0.71, which suggests that it achieves compactness though it uses six constituent lenses.

Example 2

The basic lens data of Example 2 is shown below in Table 2.

TABLE 2

| Example 2 |
|---|
| in mm |
| f = 6.764 |
| Fno = 2.40 |
| ω(°) = 41.2 |
| ih = 5.992 |

TABLE 2-continued

Example 2

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.185 | | |
| 2* | 4.053 | 1.066 | 1.5438 | 55.57 |
| 3* | −8.816 | 0.101 | | |
| 4* | 35.089 | 0.500 | 1.6142 | 25.58 |
| 5* | 4.155 | 0.648 | | |
| 6* | 8.544 | 0.710 | 1.5346 | 56.16 |
| 7* | 29.084 | 0.609 | | |
| 8* | −4.038 | 1.305 | 1.5346 | 56.16 |
| 9* | −2.016 | 0.053 | | |
| 10* | 11.903 | 0.790 | 1.6142 | 25.58 |
| 11* | 5.003 | 0.606 | | |
| 12* | 6.366 | 1.097 | 1.5346 | 56.16 |
| 13* | 2.525 | 0.600 | | |
| 14 | Infinity | 0.300 | 1.5670 | 37.80 |
| 15 | Infinity | 0.850 | | |
| Image Plane | Infinity | | | |

Constituent Lens Data

| Lens | Start Surface | Focal Length |
|---|---|---|
| 1 | 2 | 5.259 |
| 2 | 4 | −7.720 |
| 3 | 6 | 22.360 |
| 4 | 8 | 6.148 |
| 5 | 10 | −14.692 |
| 6 | 12 | −8.694 |

Composite Focal Length

| f1234 | 17.09 |
|---|---|
| f56 | −5.12 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −2.806E−03 | 1.014E−02 | 3.547E−03 | −1.407E−02 | −1.733E−02 | −8.408E−03 |
| A6 | −1.408E−03 | −6.129E−03 | 6.567E−04 | 7.185E−03 | 7.447E−04 | −5.976E−04 |
| A8 | 1.483E−04 | −8.568E−04 | −2.831E−03 | −2.432E−03 | −4.760E−04 | −1.198E−04 |
| A10 | −2.127E−04 | 2.706E−04 | 6.580E−04 | 3.266E−04 | 1.354E−04 | 6.402E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.706E+00 | 0.000E+00 | 0.000E+00 | 0.000E+00 | −5.182E+00 |
| A4 | 2.757E−04 | −1.128E−02 | 1.201E−04 | −6.202E−03 | −1.439E−02 | −8.058E−03 |
| A6 | 2.427E−03 | 1.653E−03 | −6.291E−04 | −1.038E−04 | 5.183E−04 | 4.112E−04 |
| A8 | −2.805E−05 | 1.199E−04 | 2.665E−05 | 2.933E−06 | 7.560E−06 | −1.829E−05 |
| A10 | −1.424E−05 | −1.105E−05 | −3.859E−06 | −1.143E−07 | −8.600E−07 | 4.749E−07 |
| A12 | 0.000E+00 | −5.852E−07 | 1.975E−07 | 1.777E−08 | 1.326E−08 | −6.914E−09 |
| A14 | 0.000E+00 | 2.008E−08 | 0.000E+00 | −6.163E−10 | 1.495E−10 | 7.295E−11 |
| A16 | 0.000E+00 | 0.000E+00 | 0.000E+00 | 0.000E+00 | −3.814E−12 | 0.000E+00 |

As shown in Table 12, the imaging lens in Example 2 satisfies all the conditional expressions (1) to (14).

Figure 4:
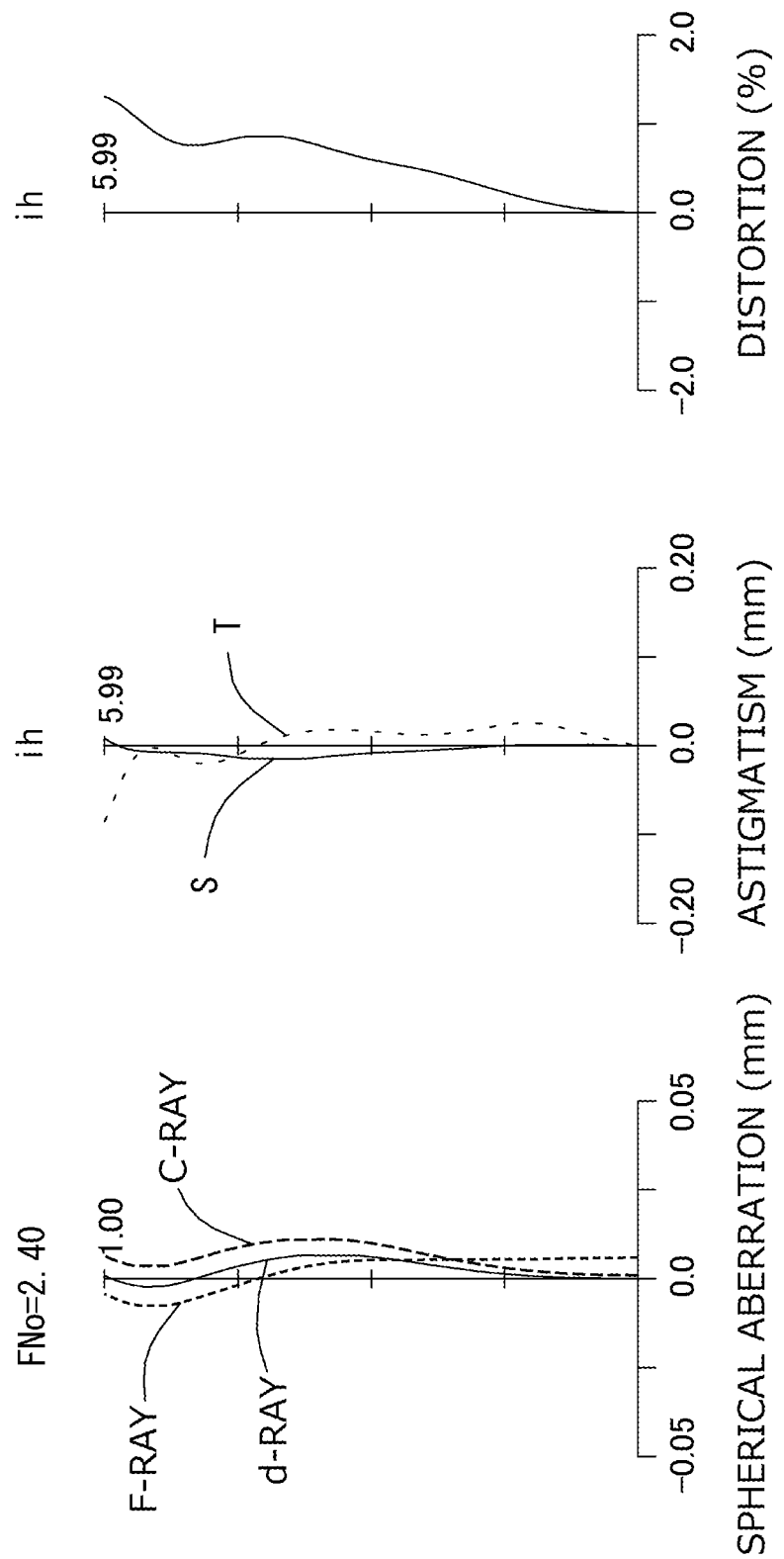
FIG. 4 shows spherical aberration, astigmatism, and distortion of the imaging lens in Example 2.
Figure 5:
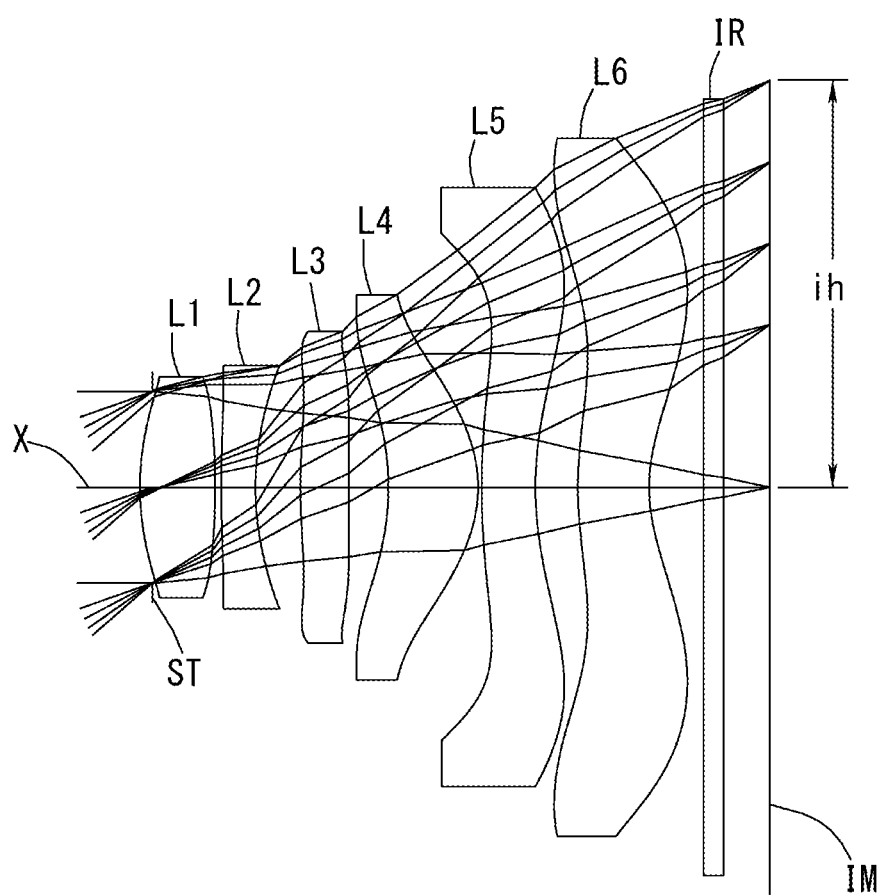
FIG. 5 is a schematic view showing the general configuration of an imaging lens in Example 3.

FIG. 4 shows spherical aberration (mm), astigmatism (mm), and distortion (%) of the imaging lens in Example 2. As shown in FIG. 4, each aberration is corrected properly.

The imaging lens provides a wide field of view of about 80 degrees and high brightness with an F-value of about 2.4. The ratio of total track length TTL to maximum image height ih (TTL/2ih) is 0.76, which suggests that it achieves compactness though it uses six constituent lenses.

Example 3

The basic lens data of Example 3 is shown below in Table 3.

TABLE 3

Example 3 in mm f = 6.765
Fno = 2.40
ω(°) = 41.2
ih = 5.992

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.185 | | |
| 2* | 4.045 | 1.107 | 1.5438 | 55.57 |
| 3* | −9.409 | 0.092 | | |
| 4* | 27.849 | 0.500 | 1.6142 | 25.58 |
| 5* | 4.146 | 0.664 | | |
| 6* | 9.263 | 0.710 | 1.5346 | 56.16 |
| 7* | 37.916 | 0.583 | | |
| 8* | −4.000 | 1.320 | 1.5346 | 56.16 |
| 9* | −2.016 | 0.053 | | |
| 10* | 12.018 | 0.790 | 1.6142 | 25.58 |
| 11* | 5.129 | 0.626 | | |
| 12* | 5.903 | 1.045 | 1.5346 | 56.16 |
| 13* | 2.440 | 0.700 | | |
| 14 | Infinity | 0.300 | 1.5640 | 51.30 |
| 15 | Infinity | 0.778 | | |
| Image Plane | Infinity | | | |

Constituent Lens Data

| Lens | Start Surface | Focal Length |
|---|---|---|
| 1 | 2 | 5.357 |
| 2 | 4 | −7.994 |
| 3 | 6 | 22.730 |
| 4 | 8 | 6.172 |
| 5 | 10 | −15.234 |
| 6 | 12 | −8.692 |

Composite Focal Length

| | |
|---|---|
| f1234 | 16.97 |
| f56 | −5.20 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −2.321E−03 | 1.017E−02 | 2.905E−03 | −1.319E−02 | −1.643E−02 | −8.716E−03 |
| A6 | −1.169E−03 | −5.693E−03 | 7.463E−04 | 6.718E−03 | 7.583E−04 | −4.328E−04 |
| A8 | 1.335E−04 | −9.045E−04 | −2.813E−03 | −2.270E−03 | −4.596E−04 | −1.578E−04 |
| A10 | −1.753E−04 | 2.848E−04 | 6.371E−04 | 3.063E−04 | 1.284E−04 | 6.544E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.719E+00 | 0.000E+00 | 0.000E+00 | 0.000E+00 | −4.942E+00 |
| A4 | −7.353E−05 | −1.185E−02 | 1.516E−04 | −5.996E−03 | −1.536E−02 | −8.186E−03 |
| A6 | 2.341E−03 | 1.710E−03 | −6.113E−04 | −1.191E−04 | 5.610E−04 | 4.145E−04 |
| A8 | −2.067E−05 | 9.533E−05 | 2.562E−05 | 4.170E−06 | 7.604E−06 | −1.769E−05 |
| A10 | −1.261E−05 | −1.102E−05 | −3.599E−06 | −9.897E−08 | −9.052E−07 | 4.691E−07 |
| A12 | 0.000E+00 | −3.537E−07 | 1.878E−07 | 1.972E−08 | 1.218E−08 | −8.036E−09 |
| A14 | 0.000E+00 | 1.675E−08 | 0.000E+00 | −7.065E−10 | 2.204E−10 | 9.571E−11 |
| A16 | 0.000E+00 | 0.000E+00 | 0.000E+00 | 0.000E+00 | −4.665E−12 | 0.000E+00 |

As shown in Table 12, the imaging lens in Example 3 satisfies all the conditional expressions (1) to (14).

Figure 6:
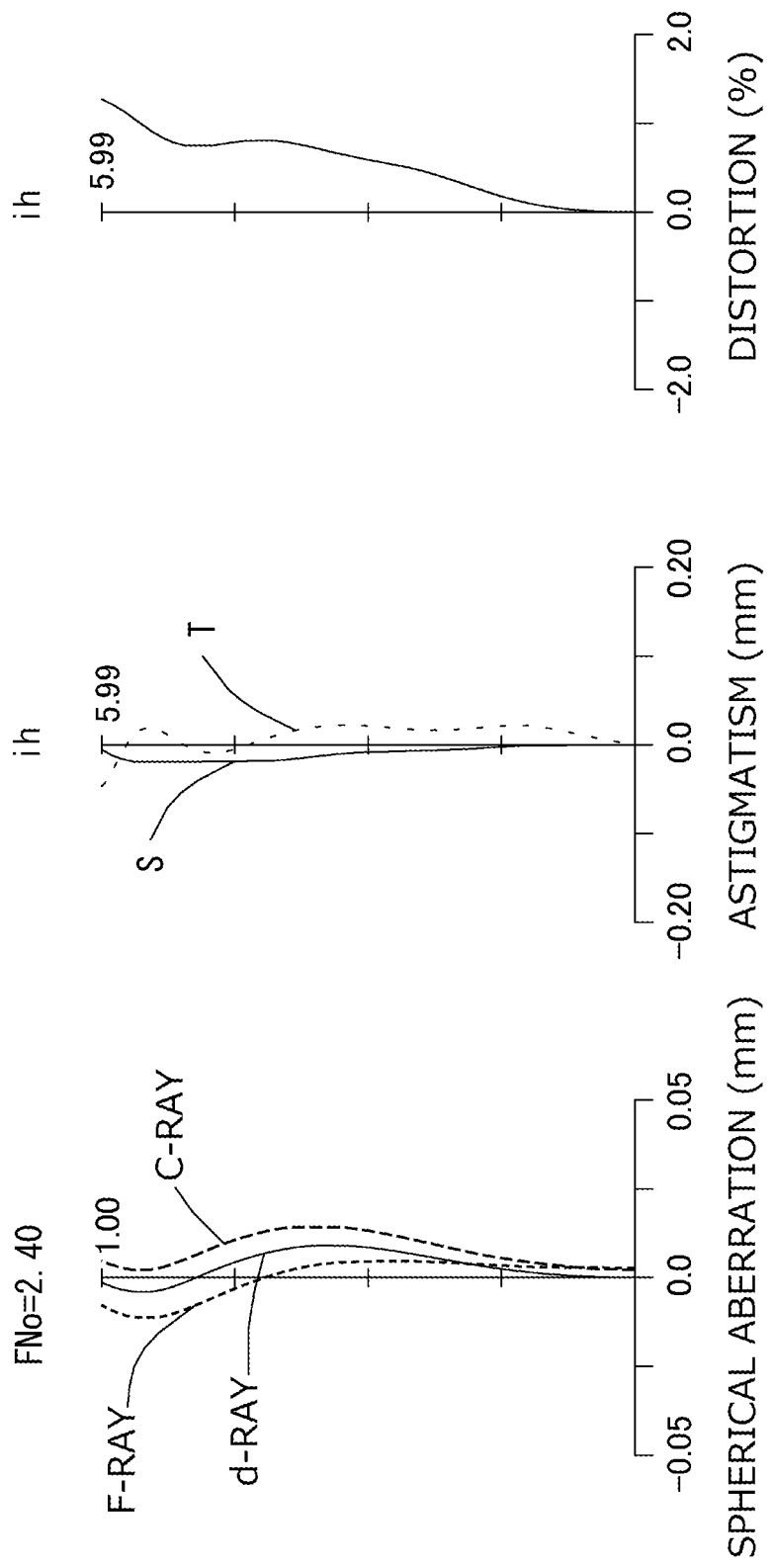
FIG. 6 shows spherical aberration, astigmatism, and distortion of the imaging lens in Example 3.
Figure 7:
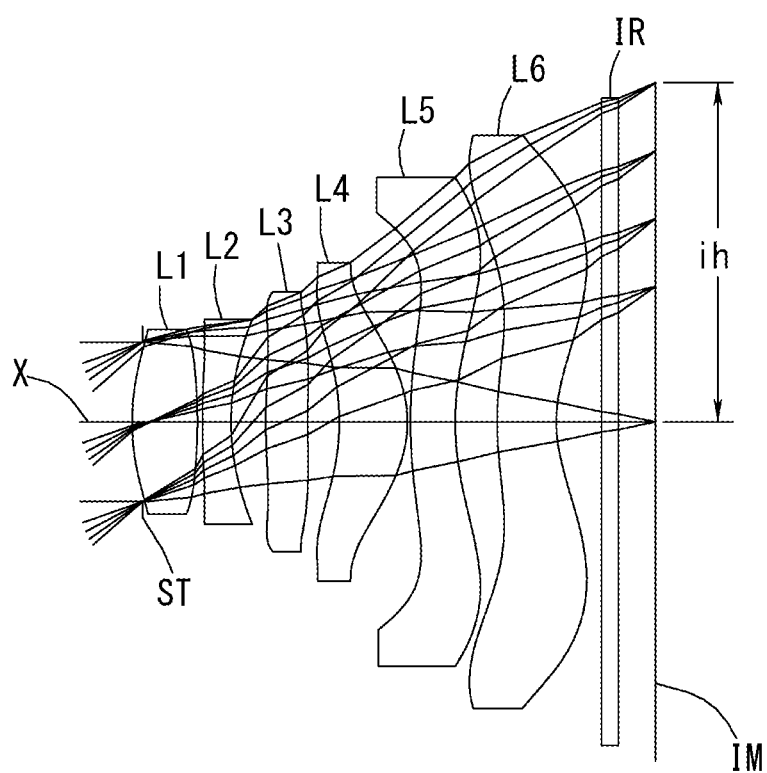
FIG. 7 is a schematic view showing the general configuration of an imaging lens in Example 4.

FIG. 6 shows spherical aberration (mm), astigmatism (mm), and distortion (%) of the imaging lens in Example 3. As shown in FIG. 6, each aberration is corrected properly.

In addition, the imaging lens provides a wide field of view of about 80 degrees and high brightness with an F-value of about 2.4. The ratio of total track length TTL to maximum image height ih (TTL/2ih) is 0.76, which suggests that it achieves compactness though it uses six constituent lenses.

Example 4

The basic lens data of Example 4 is shown below in Table 4.

TABLE 4

Example 4 in mm f = 6.769
Fno = 2.40
ω(°) = 41.1
ih = 5.992

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.185 | | |
| 2* | 4.143 | 1.151 | 1.5438 | 55.57 |
| 3* | −9.595 | 0.093 | | |
| 4* | 18.832 | 0.500 | 1.6142 | 25.58 |
| 5* | 3.909 | 0.615 | | |
| 6* | 9.711 | 0.743 | 1.5346 | 56.16 |
| 7* | 40.003 | 0.556 | | |
| 8* | −4.000 | 1.203 | 1.5346 | 56.16 |
| 9* | −2.087 | 0.053 | | |
| 10* | 9.339 | 0.790 | 1.6142 | 25.58 |
| 11* | 4.868 | 0.741 | | |
| 12* | 6.116 | 1.045 | 1.5346 | 56.16 |
| 13* | 2.542 | 0.700 | | |
| 14 | Infinity | 0.300 | 1.5640 | 51.30 |
| 15 | Infinity | 0.747 | | |
| Image Plane | Infinity | | | |

Constituent Lens Data

| Lens | Start Surface | Focal Length |
|---|---|---|
| 1 | 2 | 5.483 |
| 2 | 4 | −8.135 |
| 3 | 6 | 23.783 |
| 4 | 8 | 6.697 |
| 5 | 10 | −17.751 |
| 6 | 12 | −9.061 |

Composite Focal Length

| f1234 | 16.51 |
|---|---|
| f56 | −5.69 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −2.210E−03 | 9.089E−03 | 1.356E−03 | −1.380E−02 | −1.697E−02 | −9.231E−03 |
| A6 | −1.344E−03 | −6.188E−03 | 8.687E−05 | 6.421E−03 | 1.118E−03 | −4.131E−04 |
| A8 | 2.102E−04 | −8.021E−04 | −2.835E−03 | −2.270E−03 | −4.534E−04 | −1.512E−04 |
| A10 | −1.834E−04 | 3.026E−04 | 6.743E−04 | 3.122E−04 | 1.247E−04 | 6.095E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.830E+00 | 0.000E+00 | 0.000E+00 | 0.000E+00 | −4.906E+00 |
| A4 | 2.258E−03 | −1.203E−02 | −4.884E−04 | −6.509E−03 | −1.584E−02 | −8.460E−03 |
| A6 | 2.354E−03 | 2.072E−03 | −6.555E−04 | −1.346E−04 | 5.714E−04 | 4.204E−04 |
| A8 | −2.729E−05 | 1.060E−04 | 2.960E−05 | 5.936E−06 | 7.833E−06 | −1.818E−05 |
| A10 | −1.322E−05 | −1.255E−05 | −3.614E−06 | −1.811E−07 | −9.034E−07 | 4.686E−07 |
| A12 | 0.000E+00 | −5.059E−07 | 1.698E−07 | 1.739E−08 | 1.272E−08 | −8.040E−09 |
| A14 | 0.000E+00 | 2.375E−08 | 0.000E+00 | −6.431E−10 | 2.255E−10 | 1.149E−10 |
| A16 | 0.000E+00 | 0.000E+00 | 0.000E+00 | 0.000E+00 | −5.148E−12 | 0.000E+00 |

As shown in Table 12, the imaging lens in Example 4 satisfies all the conditional expressions (1) to (14).

Figure 8:
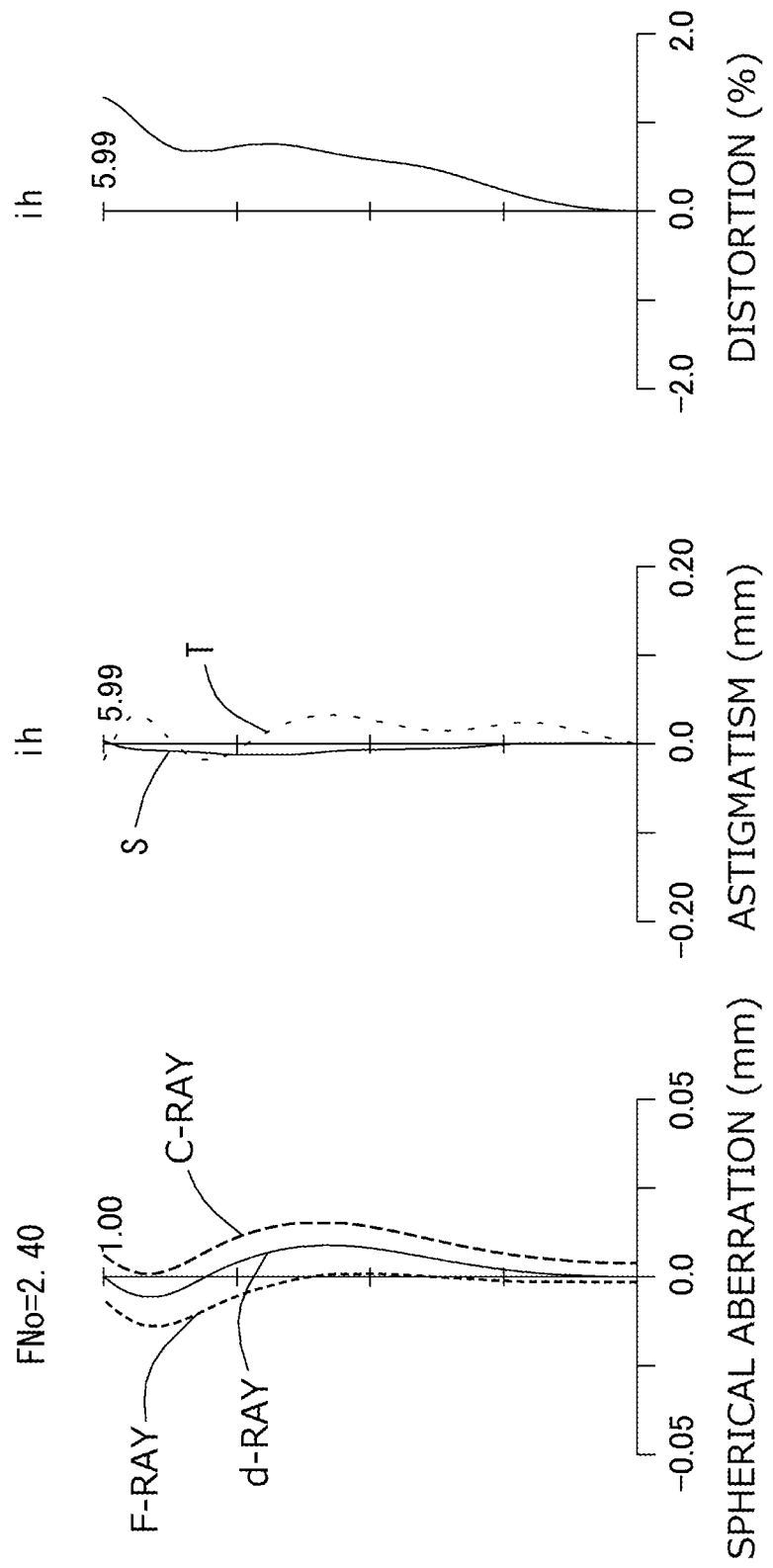
FIG. 8 shows spherical aberration, astigmatism, and distortion of the imaging lens in Example 4.
Figure 9:
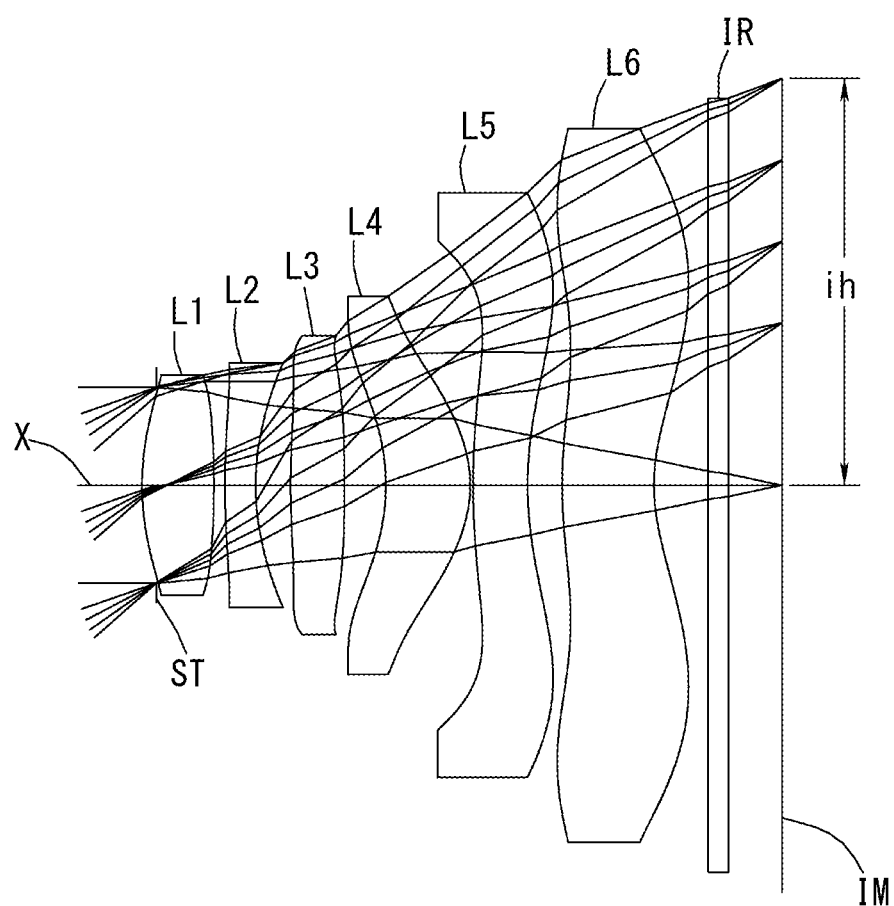
FIG. 9 is a schematic view showing the general configuration of an imaging lens in Example 5.

FIG. 8 shows spherical aberration (mm), astigmatism (mm), and distortion (%) of the imaging lens in Example 4. As shown in FIG. 8, each aberration is corrected properly.

In addition, the imaging lens provides a wide field of view of about 80 degrees and high brightness with an F-value of about 2.4. The ratio of total track length TTL to maximum image height ih (TTL/2ih) is 0.76, which suggests that it achieves compactness though it uses six constituent lenses.

Example 5

The basic lens data of Example 5 is shown below in Table 5.

TABLE 5

| Example 5 |
|---|
| in mm |

$f = 6.916$
$Fno = 2.40$
$\omega(°) = 41.4$
$ih = 5.992$

Surface Data

| Surface No. i | Curvature Radius r | Surface Distance d | Refractive Index Nd | Abbe Number νd |
|---|---|---|---|---|
| (Object Surface) | Infinity | Infinity | | |
| 1 (Stop) | Infinity | −0.21 | | |
| 2* | 4.041 | 1.047 | 1.5438 | 55.57 |
| 3* | −11.886 | 0.157 | | |
| 4* | 12.813 | 0.450 | 1.6142 | 25.58 |
| 5* | 3.618 | 0.537 | | |
| 6* | 11.710 | 0.805 | 1.5346 | 56.16 |
| 7* | −29.145 | 0.598 | | |
| 8* | −3.161 | 1.201 | 1.5346 | 56.16 |
| 9* | −1.991 | 0.045 | | |
| 10* | 10.872 | 0.800 | 1.6142 | 25.58 |
| 11* | 5.134 | 0.552 | | |
| 12* | 7.250 | 1.322 | 1.5346 | 56.16 |
| 13* | 2.811 | 0.700 | | |
| 14 | Infinity | 0.300 | 1.5640 | 51.30 |
| 15 | Infinity | 0.853 | | |
| Image Plane | Infinity | | | |

Constituent Lens Data

| Lens | Start Surface | Focal Length |
|---|---|---|
| 1 | 2 | 5.676 |
| 2 | 4 | −8.363 |
| 3 | 6 | 15.733 |
| 4 | 8 | 7.411 |
| 5 | 10 | −16.726 |
| 6 | 12 | −9.580 |

Composite Focal Length

| | | |
|---|---|---|
| | f1234 | 15.97 |
| | f56 | −5.73 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −2.474E−03 | 6.458E−03 | −5.685E−04 | −1.330E−02 | −1.392E−02 | −8.317E−03 |
| A6 | −1.289E−03 | −4.960E−03 | 1.067E−03 | 5.792E−03 | 1.054E−03 | −1.239E−04 |
| A8 | 1.559E−04 | −3.592E−04 | −2.297E−03 | −1.964E−03 | −3.285E−04 | −1.186E−04 |
| A10 | −1.830E−04 | 9.662E−05 | 4.656E−04 | 2.553E−04 | 1.262E−04 | 7.792E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.512E+00 | 0.000E+00 | 0.000E+00 | 0.000E+00 | −6.302E+00 |
| A4 | 1.987E−03 | −1.044E−02 | 1.701E−04 | −7.304E−03 | −1.291E−02 | −7.147E−03 |
| A6 | 3.203E−03 | 1.924E−03 | −9.337E−04 | −6.145E−05 | 5.602E−04 | 4.007E−04 |
| A8 | 3.133E−06 | 6.566E−05 | 5.271E−05 | 4.496E−06 | 6.196E−06 | −1.830E−05 |
| A10 | −1.964E−05 | −1.041E−05 | −3.837E−06 | −1.380E−07 | −9.614E−07 | 5.187E−07 |
| A12 | 0.000E+00 | −2.908E−07 | 1.690E−07 | 2.687E−08 | 1.342E−08 | −8.217E−09 |

TABLE 5-continued

| | | | Example 5 | | | |
|---|---|---|---|---|---|---|
| A14 | 0.000E+00 | −1.083E−08 | 0.000E+00 | −1.006E−09 | 3.714E−10 | 7.249E−11 |
| A16 | 0.000E+00 | 0.000E+00 | 0.000E+00 | 0.000E+00 | −8.245E−12 | 0.000E+00 |

As shown in Table 12, the imaging lens in Example 5 satisfies all the conditional expressions (1) to (14).

Figure 10:
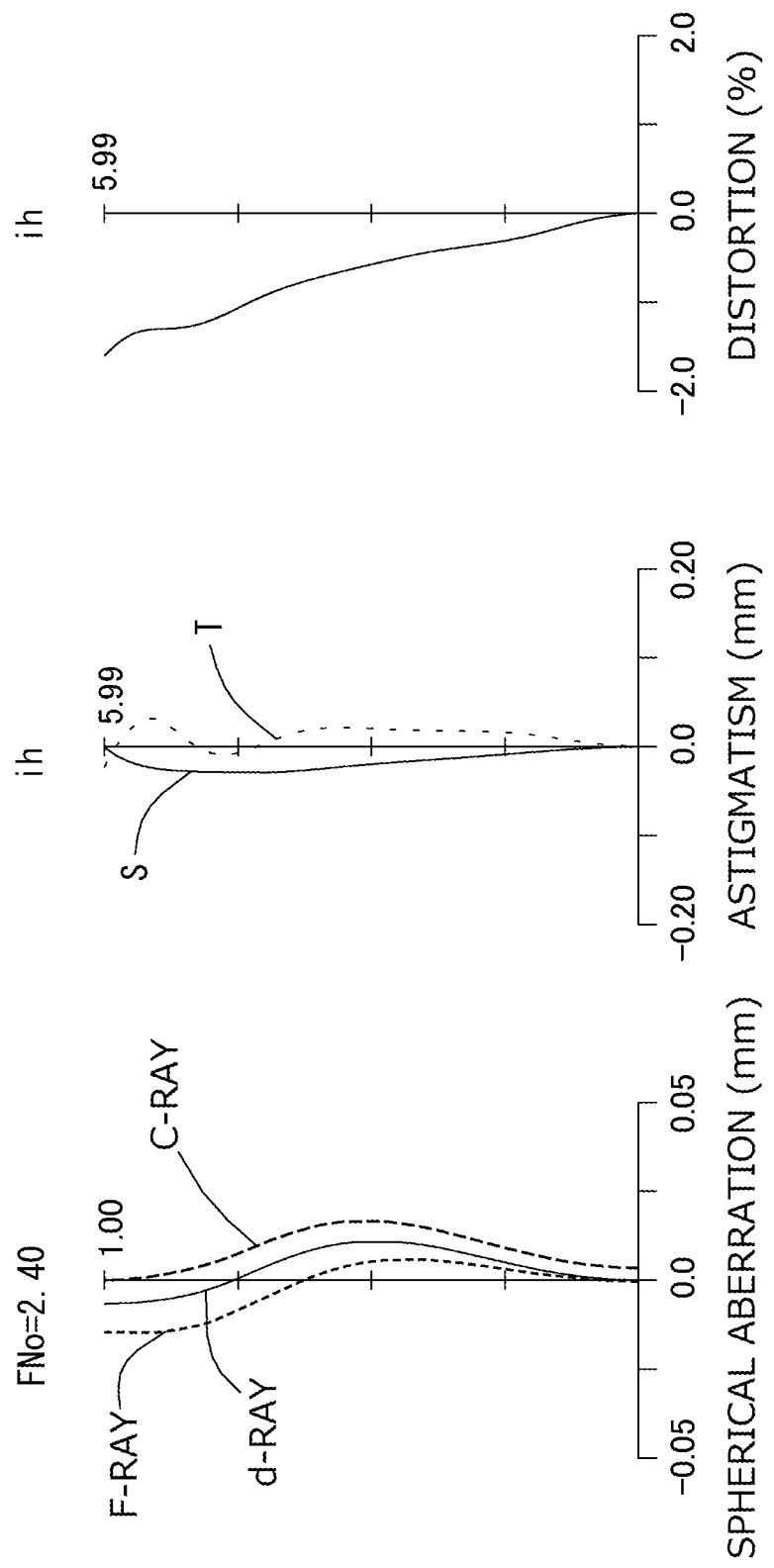
FIG. 10 shows spherical aberration, astigmatism, and distortion of the imaging lens in Example 5.
Figure 11:
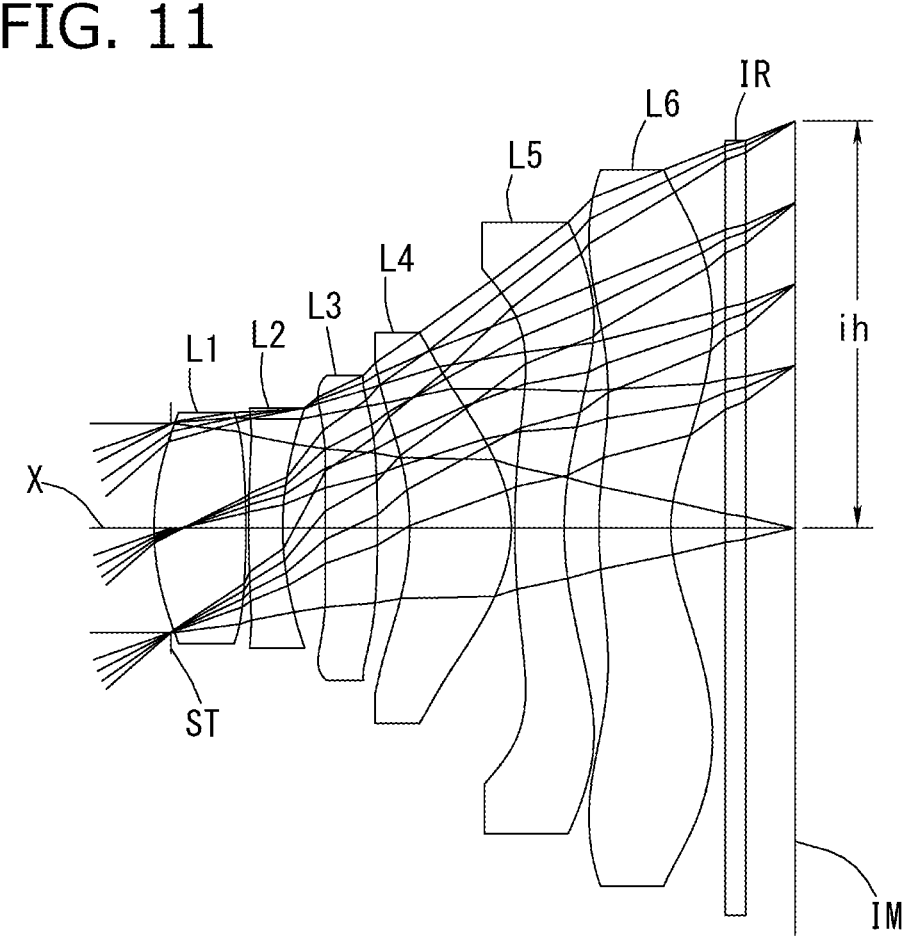
FIG. 11 is a schematic view showing the general configuration of an imaging lens in Example 6.

FIG. 10 shows spherical aberration (mm), astigmatism (mm), and distortion (%) of the imaging lens in Example 5. As shown in FIG. 10, each aberration is corrected properly.

In addition, the imaging lens provides a wide field of view of about 80 degrees and high brightness with an F-value of about 2.4. The ratio of total track length TTL to maximum image height ih (TTL/2ih) is 0.77, which suggests that it achieves compactness though it uses six constituent lenses.

Example 6

The basic lens data of Example 6 is shown below in Table 6.

TABLE 6

Example 6 in mm f = 6.758
Fno = 2.20
ω(°) = 41.2
ih = 5.992

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.25 | | |
| 2* | 3.874 | 1.352 | 1.5438 | 55.57 |
| 3* | −11.427 | 0.040 | | |
| 4* | 17.916 | 0.500 | 1.6349 | 23.97 |
| 5* | 4.274 | 0.625 | | |
| 6* | 22.712 | 0.768 | 1.5346 | 56.16 |
| 7* | −31.806 | 0.476 | | |
| 8* | −3.954 | 1.494 | 1.5346 | 56.16 |
| 9* | −1.962 | 0.053 | | |
| 10* | 12.215 | 0.727 | 1.6349 | 23.97 |
| 11* | 5.349 | 0.510 | | |
| 12* | 6.465 | 1.058 | 1.5346 | 56.16 |
| 13* | 2.364 | 0.700 | | |
| 14 | Infinity | 0.300 | 1.5640 | 51.30 |
| 15 | Infinity | 0.824 | | |
| Image Plane | Infinity | | | |

Constituent Lens Data

| Lens | Start Surface | Focal Length |
|---|---|---|
| 1 | 2 | 5.491 |
| 2 | 4 | −8.969 |
| 3 | 6 | 24.906 |
| 4 | 8 | 5.775 |
| 5 | 10 | −15.632 |
| 6 | 12 | −7.657 |

Composite Focal Length

| | |
|---|---|
| f1234 | 5.01 |
| f56 | −4.86 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −1.317E−03 | 9.839E−03 | −1.327E−03 | −1.460E−02 | −1.662E−02 | −7.424E−03 |
| A6 | −9.068E−05 | −5.052E−03 | 1.926E−03 | 6.903E−03 | 8.641E−05 | −8.022E−04 |
| A8 | −1.295E−04 | −7.660E−04 | −2.834E−03 | −2.194E−03 | −6.027E−04 | −1.129E−04 |
| A10 | −5.232E−05 | 2.202E−04 | 5.079E−04 | 2.788E−04 | 2.181E−04 | 7.240E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

TABLE 6-continued

Example 6

| | 8th Surface | 9th Surface | 10th Surface | 11th Surface | 12th Surface | 13th Surface |
|---|---|---|---|---|---|---|
| k | 0.000E+00 | −2.801E+00 | 0.000E+00 | 0.000E+00 | 0.000E+00 | −5.272E+00 |
| A4 | 2.467E−03 | −1.104E−02 | 6.824E−04 | −5.235E−03 | −1.364E−02 | −7.376E−03 |
| A6 | 1.974E−03 | 1.660E−03 | −6.541E−04 | −1.079E−04 | 5.433E−04 | 4.108E−04 |
| A8 | −6.583E−05 | 4.540E−05 | 3.554E−05 | 2.561E−06 | 6.508E−06 | −1.774E−05 |
| A10 | −1.064E−05 | −1.187E−05 | −3.363E−06 | −1.065E−07 | −9.038E−07 | 4.801E−07 |
| A12 | 0.000E+00 | −3.618E−08 | 1.458E−07 | 2.285E−08 | 1.326E−08 | −8.169E−09 |
| A14 | 0.000E+00 | 1.493E−08 | 0.000E+00 | −7.051E−10 | 2.524E−10 | 8.638E−11 |
| A16 | 0.000E+00 | 0.000E+00 | 0.000E+00 | 0.000E+00 | −5.812E−12 | 0.000E+00 |

As shown in Table 12, the imaging lens in Example 6 satisfies all the conditional expressions (1) to (14).

Figure 12:
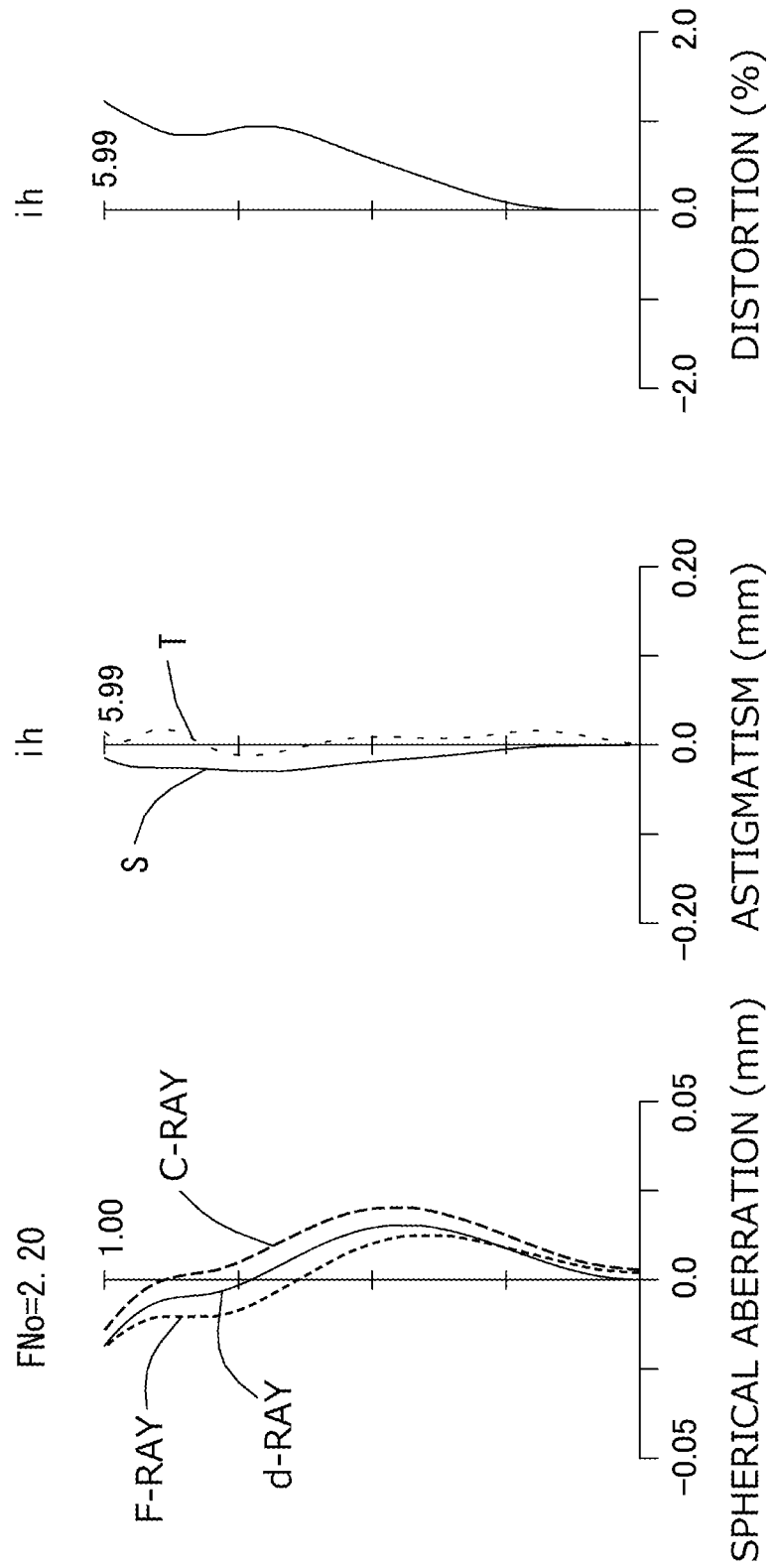
FIG. 12 shows spherical aberration, astigmatism, and distortion of the imaging lens in Example 6.
Figure 13:
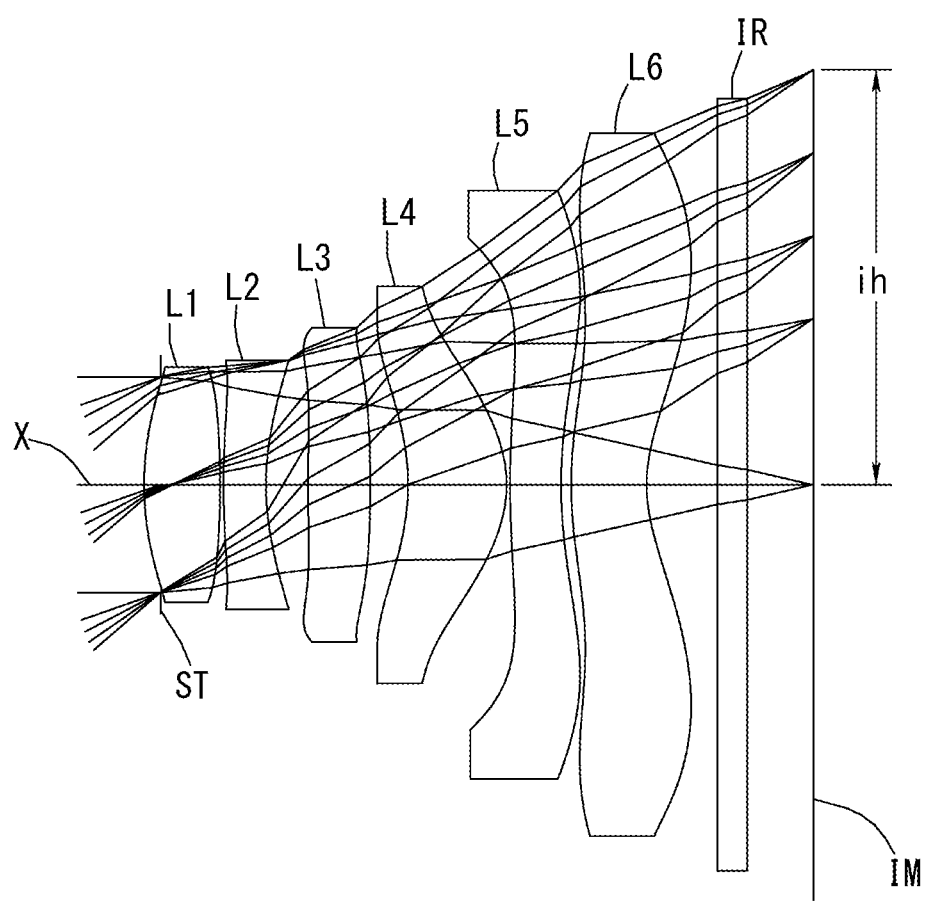
FIG. 13 is a schematic view showing the general configuration of an imaging lens in Example 7.

FIG. 12 shows spherical aberration (mm), astigmatism (mm), and distortion (%) of the imaging lens in Example 6. As shown in FIG. 12, each aberration is corrected properly.

The imaging lens provides a wide field of view of about 80 degrees and high brightness with an F-value of about 2.2. The ratio of total track length TTL to maximum image height ih (TTL/2ih) is 0.78, which suggests that it achieves compactness though it uses six constituent lenses.

Example 7

The basic lens data of Example 7 is shown below in Table 7.

TABLE 7

Example 7 in mm f = 3.344
Fno = 2.20
ω(°) = 40.9
ih = 2.934

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.115 | | |
| 2* | 2.121 | 0.537 | 1.5438 | 55.57 |
| 3* | −5.395 | 0.024 | | |
| 4* | 6.363 | 0.300 | 1.6349 | 23.97 |
| 5* | 1.929 | 0.297 | | |
| 6* | 10.412 | 0.438 | 1.5346 | 56.16 |
| 7* | −9.392 | 0.267 | | |
| 8* | −1.661 | 0.696 | 1.5346 | 56.16 |
| 9* | −0.895 | 0.025 | | |
| 10* | 7.621 | 0.360 | 1.6349 | 23.97 |
| 11* | 3.371 | 0.071 | | |
| 12* | 2.819 | 0.532 | 1.5346 | 56.16 |
| 13* | 1.076 | 0.400 | | |
| 14 | Infinity | 0.210 | 1.5640 | 51.30 |
| 15 | Infinity | 0.566 | | |
| Image Plane | Infinity | | | |

Constituent Lens Data

| Lens | Start Surface | Focal Length |
|---|---|---|
| 1 | 2 | 2.872 |
| 2 | 4 | −4.477 |
| 3 | 6 | 9.308 |
| 4 | 8 | 2.760 |
| 5 | 10 | −9.843 |
| 6 | 12 | −3.643 |

Composite Focal Length

| | |
|---|---|
| f1234 | 2.41 |
| f56 | −2.56 |

TABLE 7-continued

Example 7

Aspheric Surface Data

|     | 2nd Surface | 3rd Surface | 4th Surface | 5th Surface | 6th Surface | 7th Surface |
|-----|-------------|-------------|-------------|-------------|-------------|-------------|
| k   | 0.000E+00   | 0.000E+00   | 0.000E+00   | 0.000E+00   | 0.000E+00   | 0.000E+00   |
| A4  | −1.267E−02  | 7.401E−02   | −2.585E−02  | −1.496E−01  | −1.198E−01  | −4.751E−02  |
| A6  | −1.747E−02  | −1.340E−01  | 7.707E−02   | 2.317E−01   | 8.765E−03   | −9.571E−03  |
| A8  | 9.840E−03   | −1.367E−01  | −3.873E−01  | −3.189E−01  | −7.044E−02  | −2.603E−02  |
| A10 | −7.903E−02  | 1.031E−01   | 2.664E−01   | 1.591E−01   | 1.044E−01   | 4.047E−02   |
| A12 | 0.000E+00   | 0.000E+00   | 0.000E+00   | 0.000E+00   | 0.000E+00   | 0.000E+00   |
| A14 | 0.000E+00   | 0.000E+00   | 0.000E+00   | 0.000E+00   | 0.000E+00   | 0.000E+00   |
| A16 | 0.000E+00   | 0.000E+00   | 0.000E+00   | 0.000E+00   | 0.000E+00   | 0.000E+00   |

|     | 8th Surface | 9th Surface | 10th Surface | 11th Surface | 12th Surface | 13th Surface |
|-----|-------------|-------------|--------------|--------------|--------------|--------------|
| k   | 0.000E+00   | −2.828E+00  | 0.000E+00    | 0.000E+00    | 0.000E+00    | −5.803E+00   |
| A4  | 7.918E−02   | −1.022E−01  | −1.973E−02   | −4.227E−02   | −1.066E−01   | −5.608E−02   |
| A6  | 6.630E−02   | 7.339E−02   | −1.431E−02   | −2.868E−03   | 1.736E−02    | 1.313E−02    |
| A8  | −1.091E−02  | 5.185E−03   | 3.596E−03    | 7.170E−04    | 7.206E−04    | −2.402E−03   |
| A10 | −3.372E−03  | −6.402E−03  | −2.139E−03   | −3.990E−05   | −5.154E−04   | 2.697E−04    |
| A12 | 0.000E+00   | 2.598E−04   | 4.259E−04    | 4.923E−05    | 3.437E−05    | −1.935E−05   |
| A14 | 0.000E+00   | −4.966E−05  | 0.000E+00    | −7.958E−06   | 2.717E−06    | 9.100E−07    |
| A16 | 0.000E+00   | 0.000E+00   | 0.000E+00    | 0.000E+00    | −3.005E−07   | 0.000E+00    |

As shown in Table 12, the imaging lens in Example 7 satisfies all the conditional expressions (1) to (14).

Figure 14:
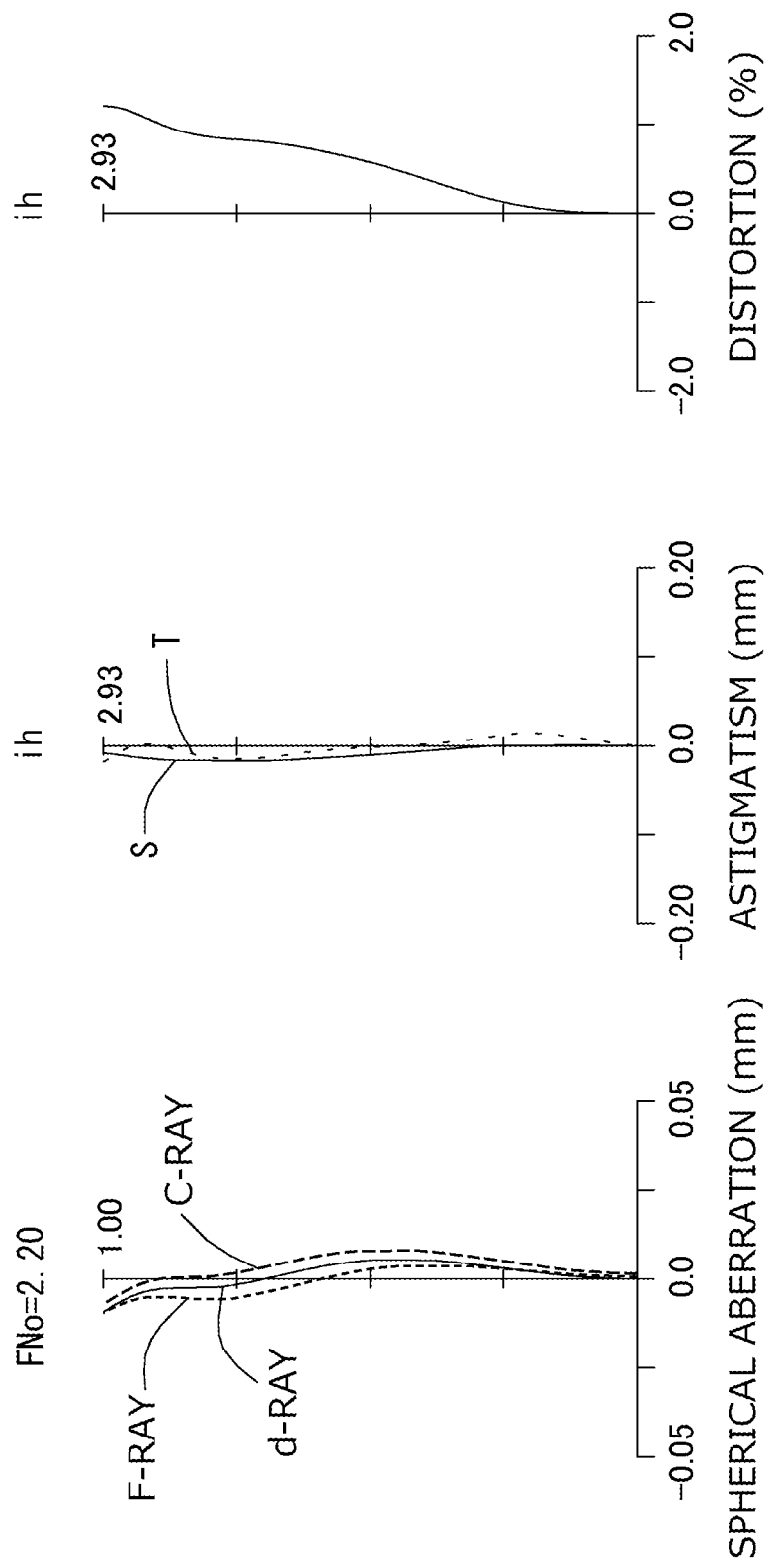
FIG. 14 shows spherical aberration, astigmatism, and distortion of the imaging lens in Example 7.
Figure 15:
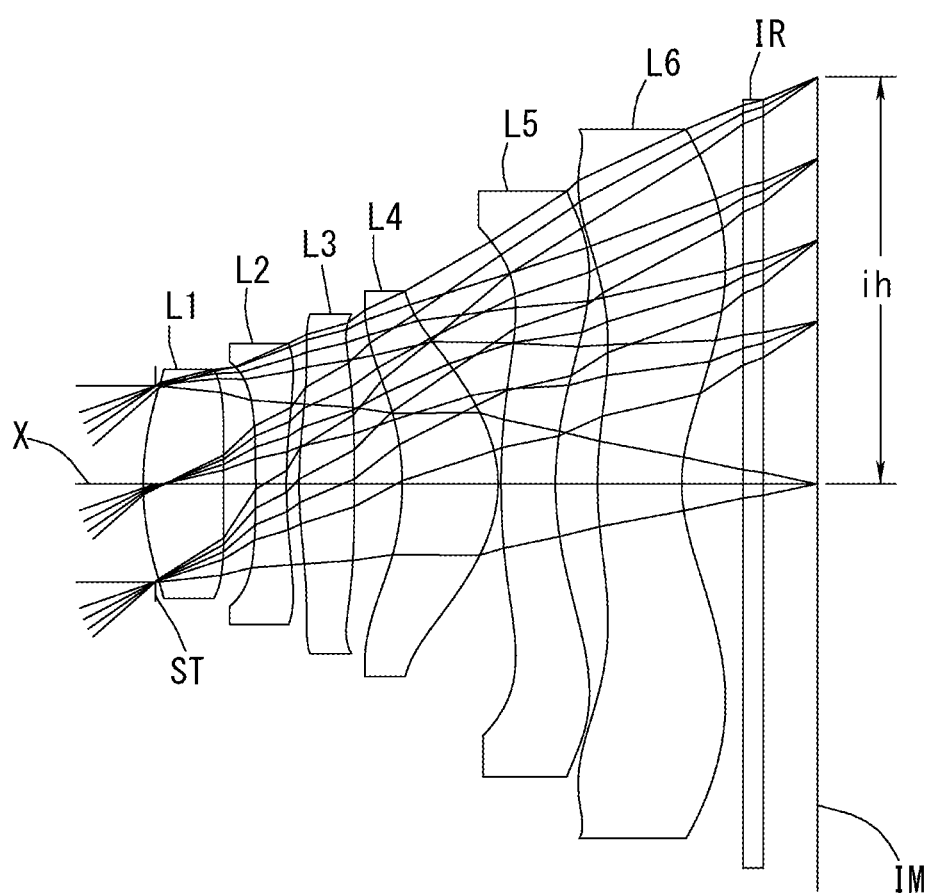
FIG. 15 is a schematic view showing the general configuration of an imaging lens in Example 8.

FIG. 14 shows spherical aberration (mm), astigmatism (mm), and distortion (%) of the imaging lens in Example 7. As shown in FIG. 14, each aberration is corrected properly.

In addition, the imaging lens provides a wide field of view of about 80 degrees and high brightness with an F-value of about 2.2. The ratio of total track length TTL to maximum image height ih (TTL/2ih) is 0.79, which suggests that it achieves compactness though it uses six constituent lenses.

Example 8

The basic lens data of Example 8 is shown below in Table 8.

TABLE 8

Example 8 in mm f = 6.913
Fno = 2.40
ω(°) = 41.4
ih = 5.992

Surface Data

| Surface No. i | Curvature Radius r | Surface Distance d | Refractive Index Nd | Abbe Number νd |
|---------------|--------------------|--------------------|--------------------|----------------|
| (Object Surface) | Infinity | Infinity | | |
| 1 (Stop) | Infinity | −0.18 | | |
| 2* | 4.294 | 1.184 | 1.5438 | 55.57 |
| 3* | 200.000 | 0.471 | | |
| 4* | −26.106 | 0.450 | 1.6142 | 25.58 |
| 5* | 7.243 | 0.187 | | |
| 6* | 6.633 | 0.813 | 1.5346 | 56.16 |
| 7* | −49.555 | 0.704 | | |
| 8* | −3.935 | 1.409 | 1.5346 | 56.16 |
| 9* | −1.943 | 0.045 | | |
| 10* | 11.832 | 0.799 | 1.6142 | 25.58 |
| 11* | 4.889 | 0.618 | | |
| 12* | 6.063 | 1.239 | 1.5346 | 56.16 |
| 13* | 2.466 | 0.700 | | |
| 14 | Infinity | 0.300 | 1.5640 | 51.30 |
| 15 | Infinity | 0.997 | | |
| Image Plane | Infinity | | | |

Constituent Lens Data

| Lens | Start Surface | Focal Length |
|------|---------------|--------------|
| 1 | 2 | 8.053 |
| 2 | 4 | −9.183 |
| 3 | 6 | 10.998 |

TABLE 8-continued

Example 8

| | | |
|---|---|---|
| 4 | 8 | 5.757 |
| 5 | 10 | −14.186 |
| 6 | 12 | −8.834 |

Composite Focal Length

| | |
|---|---|
| f1234 | 5.02 |
| f56 | −5.05 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −1.238E−03 | −5.995E−03 | −1.168E−02 | −1.474E−02 | −1.810E−02 | −6.553E−03 |
| A6 | −6.062E−04 | −3.635E−03 | −3.051E−03 | 2.514E−03 | 2.488E−03 | 4.182E−04 |
| A8 | 1.726E−04 | 3.712E−04 | 9.538E−06 | −6.658E−04 | −4.442E−04 | −1.100E−04 |
| A10 | −1.519E−04 | −2.456E−04 | −2.696E−04 | 1.943E−05 | 4.679E−05 | 3.600E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.589E+00 | 0.000E+00 | 0.000E+00 | 0.000E+00 | −4.863E+00 |
| A4 | −5.026E−03 | −1.322E−02 | 4.201E−03 | −4.963E−03 | −1.318E−02 | −7.355E−03 |
| A6 | 3.086E−03 | 1.712E−03 | −1.337E−03 | −3.104E−03 | 4.018E−04 | 4.555E−04 |
| A8 | −4.218E−05 | −7.045E−05 | 1.060E−04 | 2.256E−05 | 8.378E−06 | −2.390E−05 |
| A10 | −1.427E−05 | 5.363E−06 | −6.562E−06 | −1.036E−06 | −8.208E−07 | 8.323E−07 |
| A12 | 0.000E+00 | 1.730E−06 | 1.860E−07 | 2.383E−08 | 1.535E−08 | −1.568E−08 |
| A14 | 0.000E+00 | −1.920E−07 | 0.000E+00 | −7.919E−11 | 3.578E−10 | 1.173E−10 |
| A16 | 0.000E+00 | 0.000E+00 | 0.000E+00 | 0.000E+00 | −1.367E−11 | 0.000E+00 |

As shown in Table 12, the imaging lens in Example 8 satisfies all the conditional expressions (1) to (14).

Figure 16:
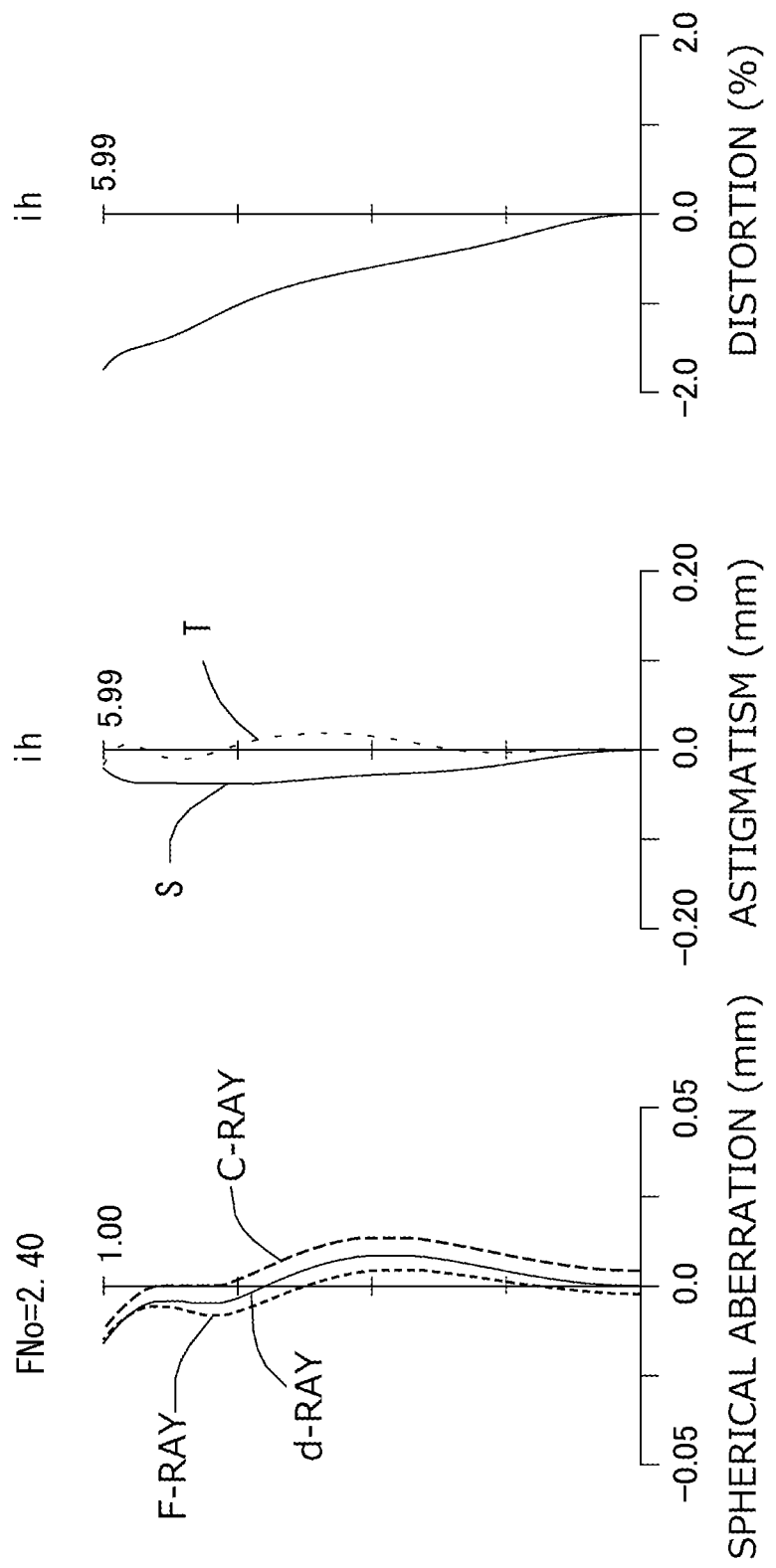
FIG. 16 shows spherical aberration, astigmatism, and distortion of the imaging lens in Example 8.
Figure 17:
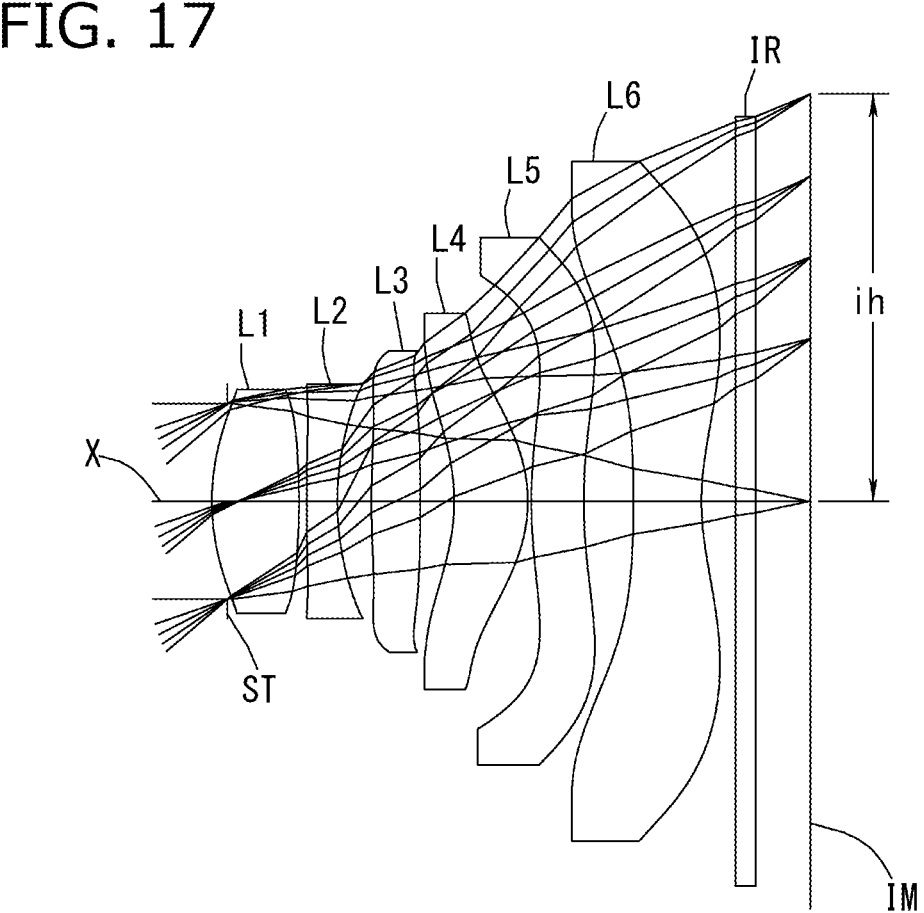
FIG. 17 is a schematic view showing the general configuration of an imaging lens in Example 9.

FIG. 16 shows spherical aberration (mm), astigmatism (mm), and distortion (%) of the imaging lens in Example 8. As shown in FIG. 16, each aberration is corrected properly.

In addition, the imaging lens provides a wide field of view of about 80 degrees and high brightness with an F-value of about 2.4. The ratio of total track length TTL to maximum image height ih (TTL/2ih) is 0.82, which suggests that it achieves compactness though it uses six constituent lenses.

Example 9

The basic lens data of Example 9 is shown below in Table 9.

TABLE 9

Example 9 in mm f = 6.909
Fno = 2.41
ω(°) = 41.0
ih = 5.992

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.23 | | |
| 2* | 3.400 | 1.281 | 1.5438 | 55.57 |
| 3* | −10.751 | 0.114 | | |
| 4* | 32.750 | 0.450 | 1.6349 | 23.97 |
| 5* | 4.090 | 0.501 | | |
| 6* | 10.920 | 0.716 | 1.5346 | 56.16 |
| 7* | −105.924 | 0.501 | | |
| 8* | −3.044 | 1.083 | 1.5346 | 56.16 |
| 9* | −2.194 | 0.053 | | |
| 10* | 7.154 | 0.769 | 1.6142 | 25.58 |
| 11* | 7.331 | 0.731 | | |
| 12* | −21.180 | 1.000 | 1.5346 | 56.16 |
| 13* | 3.815 | 0.700 | | |

TABLE 9-continued

Example 9

| | | | | |
|---|---|---|---|---|
| 14 | Infinity | 0.300 | 1.5640 | 51.30 |
| 15 | Infinity | 0.603 | | |
| Image Plane | Infinity | | | |

Constituent Lens Data

| Lens | Start Surface | Focal Length |
|---|---|---|
| 1 | 2 | 4.906 |
| 2 | 4 | −7.405 |
| 3 | 6 | 18.556 |
| 4 | 8 | 10.177 |
| 5 | 10 | 181.806 |
| 6 | 12 | −5.963 |

Composite Focal Length

| | |
|---|---|
| f1234 | 5.77 |
| f56 | −6.49 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −2.054E−03 | 7.097E−03 | 1.854E−03 | −9.973E−03 | −1.741E−02 | −7.205E−03 |
| A6 | −1.032E−03 | −6.396E−03 | −3.369E−04 | 6.640E−03 | 1.031E−03 | −2.310E−04 |
| A8 | 1.635E−04 | −5.385E−04 | −2.670E−03 | −2.290E−03 | −3.293E−04 | −1.787E−04 |
| A10 | −1.975E−04 | 2.329E−04 | 6.838E−04 | 3.700E−04 | 1.826E−04 | 1.002E−04 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.488E+00 | 0.000E+00 | 0.000E+00 | 0.000E+00 | −1.000E+01 |
| A4 | 1.689E−02 | −8.823E−03 | −1.043E−02 | −6.524E−03 | −9.314E−03 | −8.578E−03 |
| A6 | 1.595E−03 | 2.685E−03 | 3.311E−04 | −2.498E−04 | 5.346E−04 | 5.101E−04 |
| A8 | 2.109E−05 | 9.872E−05 | −4.170E−05 | 1.449E−05 | 6.335E−06 | −2.015E−05 |
| A10 | −2.603E−05 | −2.210E−05 | −5.012E−06 | −5.031E−07 | −9.193E−07 | 4.062E−07 |
| A12 | 0.000E+00 | −1.308E−06 | 4.209E−07 | −5.571E−10 | 1.189E−08 | −7.831E−09 |
| A14 | 0.000E+00 | 8.363E−08 | 0.000E+00 | 1.274E−09 | 1.700E−10 | 1.639E−10 |
| A16 | 0.000E+00 | 0.000E+00 | 0.000E+00 | 0.000E+00 | −1.078E−12 | 0.000E+00 |

As shown in Table 12, the imaging lens in Example 9 satisfies all the conditional expressions (1) to (14).

Figure 18:
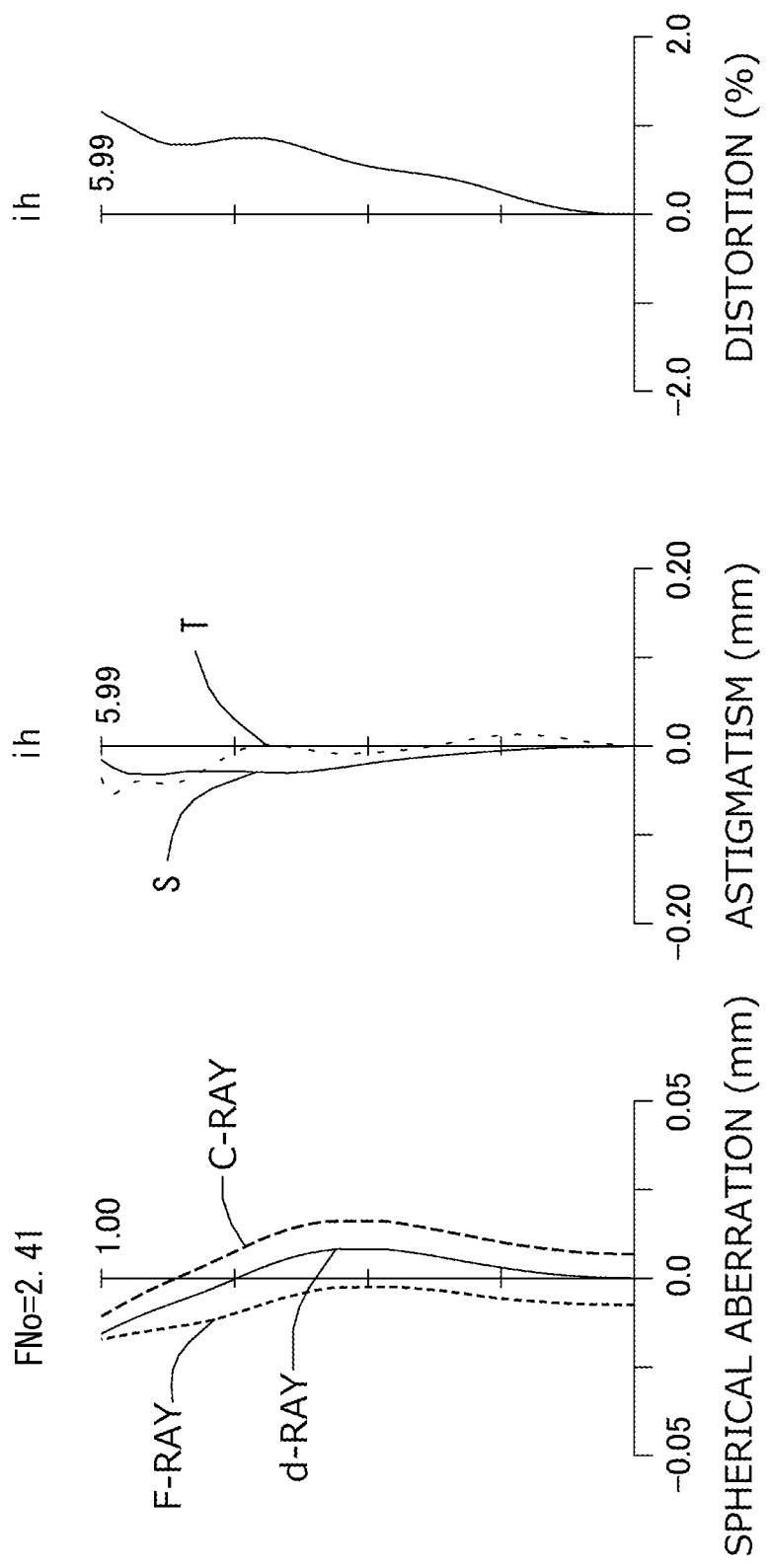
FIG. 18 shows spherical aberration, astigmatism, and distortion of the imaging lens in Example 9.
Figure 19:
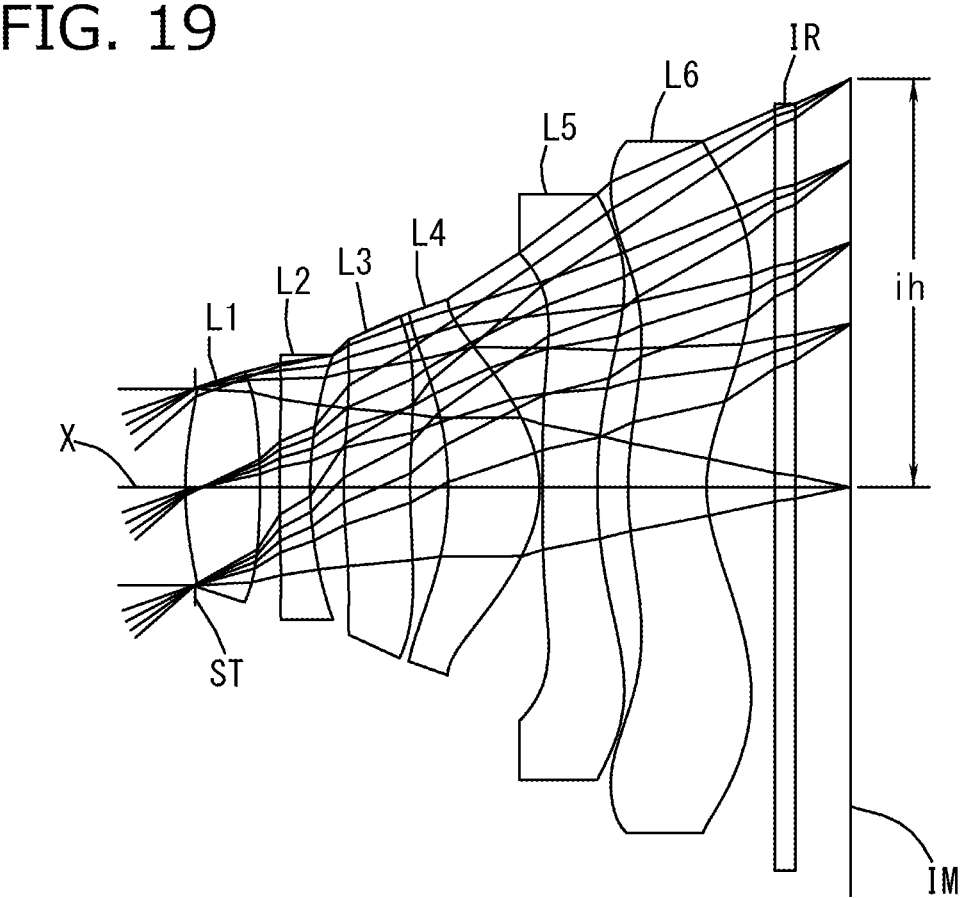
FIG. 19 is a schematic view showing the general configuration of an imaging lens in Example 10.

FIG. 18 shows spherical aberration (mm), astigmatism (mm), and distortion (%) of the imaging lens in Example 9. As shown in FIG. 18, each aberration is corrected properly.

In addition, the imaging lens provides a wide field of view of about 80 degrees and high brightness with an F-value of about 2.4. The ratio of total track length TTL to maximum image height ih (TTL/2ih) is 0.73, which suggests that it achieves compactness though it uses six constituent lenses.

Example 10

The basic lens data of Example 10 is shown below in Table 10.

TABLE 10

Example 10 in mm f = 6.913
Fno = 2.40
ω(°) = 41.4
ih = 5.992

Surface Data

| Surface No. i | Curvature Radius r | Surface Distance d | Refractive Index Nd | Abbe Number vd |
|---|---|---|---|---|
| (Object Surface) | Infinity | Infinity | | |
| 1 (Stop) | Infinity | −0.15 | | |
| 2* | 5.000 | 1.092 | 1.5438 | 55.57 |
| 3* | −12.801 | 0.288 | | |
| 4* | 33.017 | 0.450 | 1.6355 | 23.91 |

TABLE 10-continued

| | Example 10 | | | |
|---|---|---|---|---|
| 5* | 5.658 | 0.491 | | |
| 6* | 7.463 | 0.976 | 1.5346 | 56.16 |
| 7* | 12.272 | 0.551 | | |
| 8* | −4.977 | 1.342 | 1.5346 | 56.16 |
| 9* | −1.810 | 0.045 | | |
| 10* | −197.213 | 0.800 | 1.6142 | 25.58 |
| 11* | 7.294 | 0.451 | | |
| 12* | 5.257 | 1.150 | 1.5346 | 56.16 |
| 13* | 2.200 | 1.000 | | |
| 14 | Infinity | 0.300 | 1.5640 | 51.30 |
| 15 | Infinity | 0.809 | | |
| Image Plane | Infinity | | | |

Constituent Lens Data

| Lens | Start Surface | Focal Length |
|---|---|---|
| 1 | 2 | 6.758 |
| 2 | 4 | −10.823 |
| 3 | 6 | 33.265 |
| 4 | 8 | 4.637 |
| 5 | 10 | −11.435 |
| 6 | 12 | −8.143 |

Composite Focal Length

| f1234 | 4.64 |
|---|---|
| f56 | −4.33 |

Aspheric Surface Data

| | 2nd Surface | 3rd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | −4.597E−03 | −5.555E−03 | 5.888E−06 | −4.801E−03 | −1.949E−02 | −1.047E−02 |
| A6 | −1.478E−03 | −2.588E−03 | −9.844E−05 | 3.145E−03 | 2.205E−03 | −2.179E−04 |
| A8 | 1.482E−05 | −3.202E−04 | −1.061E−03 | −1.060E−03 | −3.529E−04 | 8.678E−05 |
| A10 | −1.200E−04 | 7.228E−05 | 2.393E−04 | 1.384E−04 | 5.625E−05 | −8.720E−06 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.653E+00 | 0.000E+00 | 0.000E+00 | 0.000E+00 | −4.743E+00 |
| A4 | −7.814E−03 | −1.277E−02 | 1.231E−02 | 1.336E−03 | −1.520E−02 | −8.717E−03 |
| A6 | 2.935E−03 | 1.553E−03 | −2.235E−03 | −7.505E−04 | 8.498E−04 | 7.948E−04 |
| A8 | −2.505E−04 | −4.834E−05 | 1.591E−04 | 3.660E−05 | −6.573E−05 | −7.230E−05 |
| A10 | 8.593E−06 | −7.511E−08 | −9.556E−06 | −1.218E−06 | 4.344E−06 | 4.070E−06 |
| A12 | 0.000E+00 | 1.099E−06 | 2.849E−07 | 5.111E−08 | −1.365E−07 | −1.197E−07 |
| A14 | 0.000E+00 | −1.634E−08 | 0.000E+00 | −1.095E−09 | 1.428E−09 | 1.422E−09 |
| A16 | 0.000E+00 | 0.000E+00 | 0.000E+00 | 0.000E+00 | 2.300E−12 | 0.000E+00 |

As shown in Table 12, the imaging lens in Example 10 satisfies all the conditional expressions (1) to (14).

Figure 20:
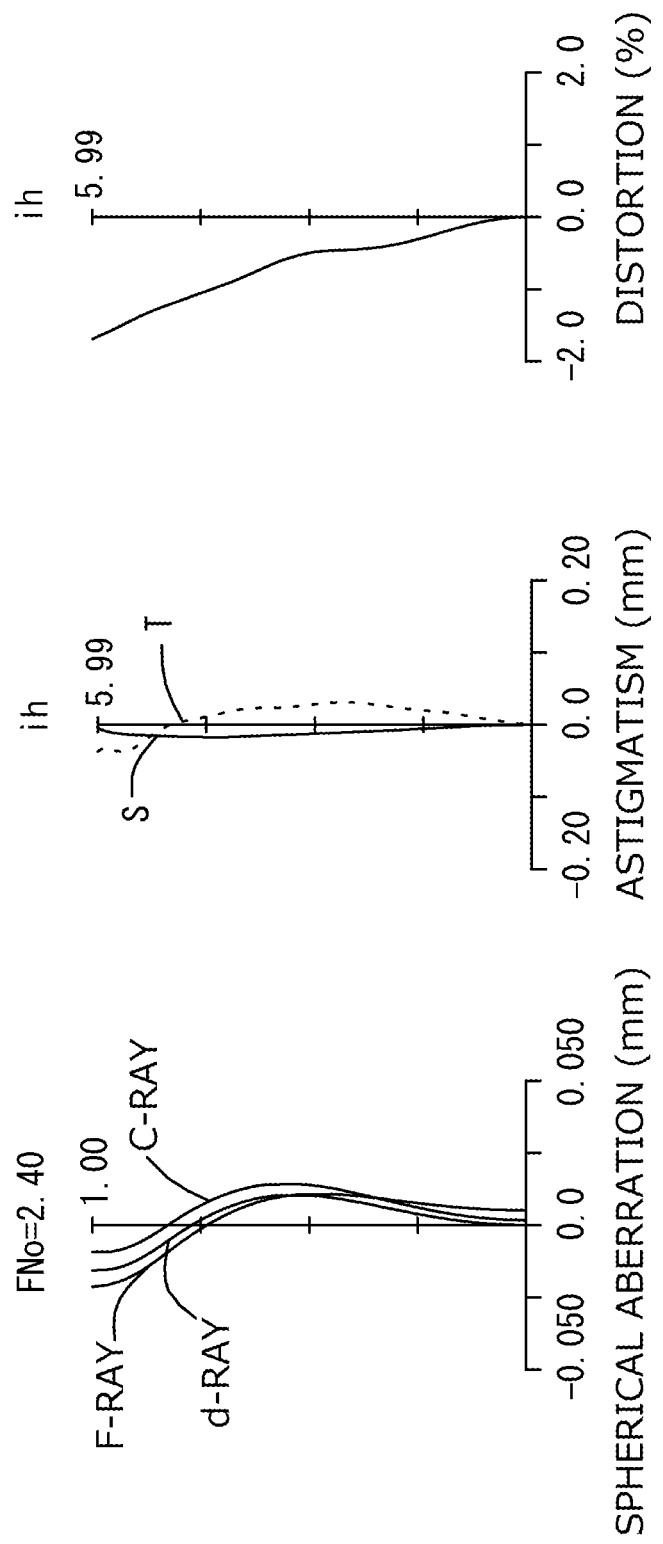
FIG. 20 shows spherical aberration, astigmatism, and distortion of the imaging lens in Example 10.
Figure 21:
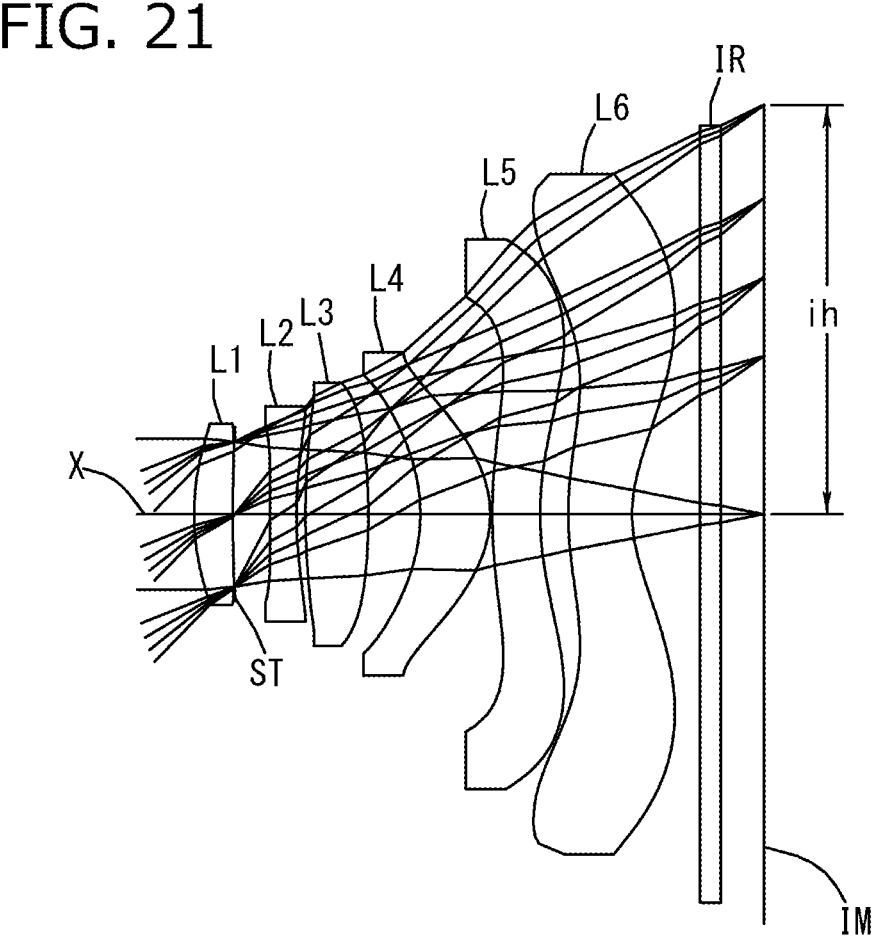
FIG. 21 is a schematic view showing the general configuration of an imaging lens in Example 11.

FIG. 20 shows spherical aberration (mm), astigmatism (mm), and distortion (%) of the imaging lens in Example 10. As shown in FIG. 20, each aberration is corrected properly.

In addition, the imaging lens provides a wide field of view of about 80 degrees and high brightness with an F-value of about 2.4. The ratio of total track length TTL to maximum image height ih (TTL/2ih) is 0.80, which suggests that it achieves compactness though it uses six constituent lenses.

Example 11

The basic lens data of Example 11 is shown below in Table 11.

TABLE 11

| Example 11 |
|---|
| in mm |
| f = 5.759 |
| Fno = 2.61 |
| ω(°) = 45.7 |
| ih = 5.992 |

TABLE 11-continued

Example 11

Surface Data

| Surface No. i | Curvature Radius r | Surface Distance d | Refractive Index Nd | Abbe Number vd |
|---|---|---|---|---|
| (Object Surface) | Infinity | Infinity | | |
| 1* | 3.645 | 0.565 | 1.5438 | 55.57 |
| 2* | 18.893 | 0.032 | | |
| 3 (Stop) | Infinity | 0.514 | | |
| 4* | 68.525 | 0.390 | 1.6355 | 23.91 |
| 5* | 6.299 | 0.130 | | |
| 6* | 9.539 | 0.921 | 1.5346 | 56.16 |
| 7* | −10.065 | 0.762 | | |
| 8* | −2.630 | 1.024 | 1.5346 | 56.16 |
| 9* | −1.586 | 0.030 | | |
| 10* | 7.455 | 0.700 | 1.6355 | 23.91 |
| 11* | 4.517 | 0.414 | | |
| 12* | 4.968 | 0.934 | 1.5346 | 56.16 |
| 13* | 2.042 | 1.000 | | |
| 14 | Infinity | 0.300 | 1.5640 | 51.30 |
| 15 | Infinity | 0.636 | | |
| Image Plane | Infinity | | | |

Constituent Lens Data

| Lens | Start Surface | Focal Length |
|---|---|---|
| 1 | 2 | 8.199 |
| 2 | 4 | −10.952 |
| 3 | 6 | 9.313 |
| 4 | 8 | 5.570 |
| 5 | 10 | −19.889 |
| 6 | 12 | −7.298 |

Composite Focal Length

| | |
|---|---|
| f1234 | 4.41 |
| f56 | −5.18 |

Aspheric Surface Data

| | 1st Surface | 2nd Surface | 4th Surface | 5th Surface | 6th Surface | 7th Surface |
|---|---|---|---|---|---|---|
| k | 0.000E+00 | 0.000E+00 | 0.000E+00 | 0.000E+00 | 0.000E+00 | 0.000E+00 |
| A4 | 4.343E−05 | −3.910E−03 | −1.396E−02 | −9.859E−03 | −8.799E−03 | −4.773E−03 |
| A6 | −2.066E−03 | −3.476E−03 | −6.107E−03 | 1.527E−03 | 2.118E−03 | −1.361E−03 |
| A8 | 1.401E−03 | −7.714E−04 | 6.014E−04 | −9.641E−04 | 1.897E−04 | −1.950E−04 |
| A10 | −1.297E−03 | −8.181E−04 | −1.181E−03 | 6.941E−05 | −9.219E−05 | −4.487E−05 |
| A12 | 0.000E+00 | 0.000E+00 | 0.000E+00 | 0.000E+00 | 0.000E+00 | 0.000E+00 |
| A14 | 0.000E+00 | 0.000E+00 | 0.000E+00 | 0.000E+00 | 0.000E+00 | 0.000E+00 |
| A16 | 0.000E+00 | 0.000E+00 | 0.000E+00 | 0.000E+00 | 0.000E+00 | 0.000E+00 |

| | 8th Surface | 9th Surface | 10th Surface | 11th Surface | 12th Surface | 13th Surface |
|---|---|---|---|---|---|---|
| k | 0.000E+00 | −2.422E+00 | 0.000E+00 | 0.000E+00 | 0.000E+00 | −4.772E+00 |
| A4 | 2.518E−03 | −2.843E−02 | −5.843E−03 | −1.010E−02 | −1.775E−02 | −8.886E−03 |
| A6 | 2.815E−03 | 5.152E−03 | −2.899E−04 | −1.417E−04 | 5.175E−04 | 4.875E−04 |
| A8 | 1.128E−04 | −4.842E−04 | −7.986E−06 | 2.549E−05 | 5.221E−06 | −2.013E−05 |
| A10 | −1.134E−04 | 7.897E−05 | 1.285E−06 | −1.525E−06 | −3.995E−07 | 4.873E−07 |
| A12 | 0.000E+00 | −3.041E−06 | 1.488E−07 | 1.974E−08 | 7.138E−09 | −7.890E−09 |
| A14 | 0.000E+00 | 3.546E−08 | −3.481E−08 | −3.768E−10 | −2.883E−10 | 9.866E−11 |
| A16 | 0.000E+00 | 0.000E+00 | 0.000E+00 | 0.000E+00 | 0.000E+00 | 0.000E+00 |

As shown in Table 12, the imaging lens in Example 11 satisfies all the conditional expressions (1) to (14).

Figure 22:
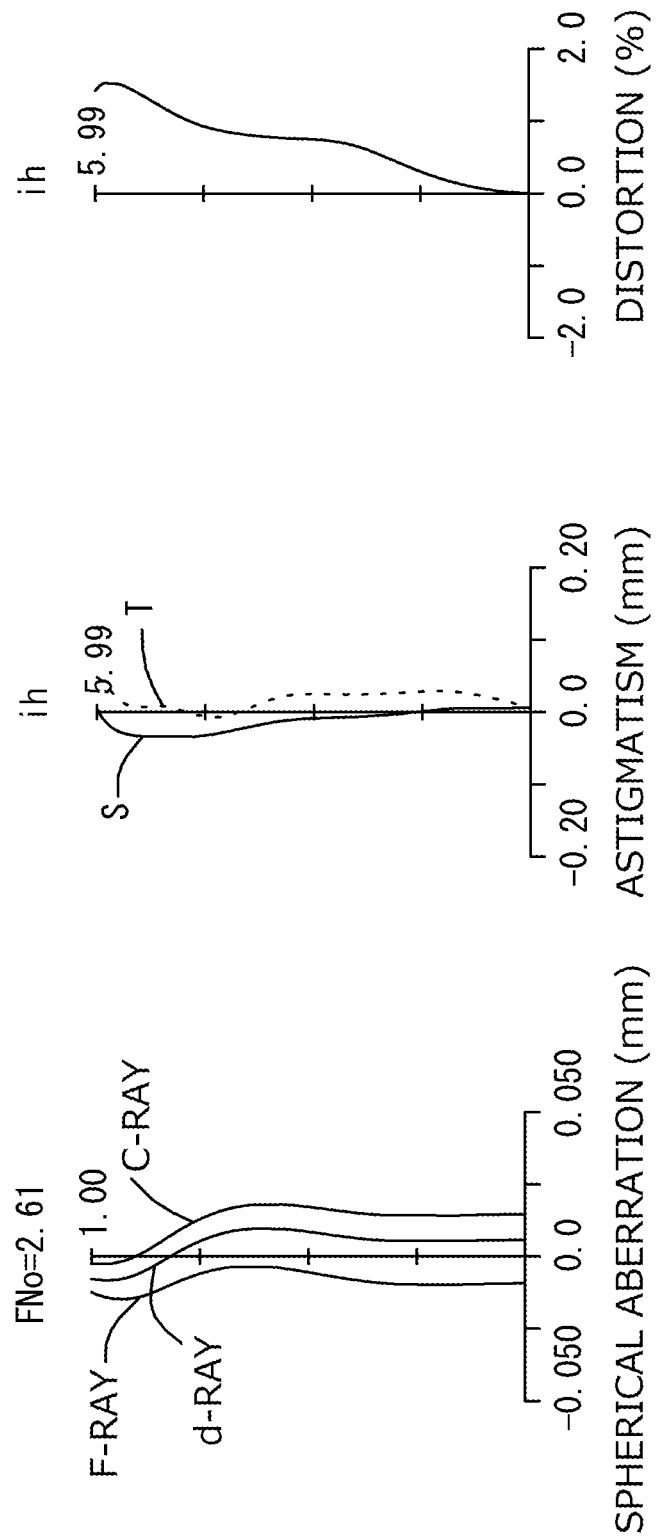
FIG. 22 shows spherical aberration, astigmatism, and distortion of the imaging lens in Example 11.

FIG. 22 shows spherical aberration (mm), astigmatism (mm), and distortion (%) of the imaging lens in Example 11. As shown in FIG. 22, each aberration is corrected properly.

In addition, the imaging lens provides a wide field of view of about 90 degrees and high brightness with an F-value of about 2.6. The ratio of total track length TTL to maximum image height ih (TTL/2ih) is 0.69, which suggests that it achieves compactness though it uses six constituent lenses.

As explained above, the imaging lenses according to the preferred embodiment of the present invention realize a high-resolution optical system which provides a wide field of view of about 80 to 90 degrees and corrects aberrations properly. In addition, the ratio of total track length TTL to maximum image height ih (TTL/2ih) is 0.85 or less, achieving compactness. They also provide high brightness with an F-value of 2.2 to 2.6.

Table 12 shows data on Examples 1 to 11 in relation to the conditional expressions (1) to (14).

TABLE 12

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Conditional Expression (1) $0.55 < f1/f < 1.5$ | 0.71 | 0.78 | 0.79 | 0.81 | 0.82 | 0.81 | 0.86 | 1.16 | 0.71 | 0.98 | 1.42 |
| Conditional Expression (2) $-2.0 < f2/f < -0.9$ | −1.07 | −1.14 | −1.18 | −1.20 | −1.21 | −1.33 | −1.34 | −1.33 | −1.07 | −1.57 | −1.90 |
| Conditional Expression (3) $45 < vd1 < 80$ | 55.57 | 55.57 | 55.57 | 55.57 | 55.57 | 55.57 | 55.57 | 55.57 | 55.57 | 55.57 | 55.57 |
| Conditional Expression (4) $20 < vd2 < 40$ | 25.58 | 25.58 | 25.58 | 25.58 | 25.58 | 23.97 | 23.97 | 25.58 | 23.97 | 23.91 | 23.91 |
| Conditional Expression (5) $50 < vd3 < 75$ | 56.16 | 56.16 | 56.16 | 56.16 | 56.16 | 56.16 | 56.16 | 56.16 | 56.16 | 56.16 | 56.16 |
| Conditional Expression (6) $50 < vd4 < 75$ | 56.16 | 56.16 | 56.16 | 56.16 | 56.16 | 56.16 | 56.16 | 56.16 | 56.16 | 56.16 | 56.16 |
| Conditional Expression (7) $20 < vd5 < 40$ | 25.58 | 25.58 | 25.58 | 25.58 | 25.58 | 23.97 | 23.97 | 25.58 | 25.58 | 25.58 | 23.91 |
| Conditional Expression (8) $50 < vd6 < 75$ | 56.16 | 56.16 | 56.16 | 56.16 | 56.16 | 56.16 | 56.16 | 56.16 | 56.16 | 56.16 | 56.16 |
| Conditional Expression (9) $0.65 < \Sigma d/TTL < 0.90$ | 0.86 | 0.82 | 0.82 | 0.82 | 0.81 | 0.82 | 0.76 | 0.81 | 0.82 | 0.79 | 0.78 |
| Conditional Expression (10) $TTL/f < 1.6$ | 1.26 | 1.35 | 1.35 | 1.35 | 1.34 | 1.38 | 1.39 | 1.42 | 1.27 | 1.39 | 1.43 |
| Conditional Expression (11) $0.8 < ih/f < 1.2$ | 0.89 | 0.89 | 0.89 | 0.89 | 0.87 | 0.89 | 0.88 | 0.87 | 0.87 | 0.87 | 1.04 |
| Conditional Expression (12) $1.3 < f3/f < 7.0$ | 5.83 | 3.31 | 3.36 | 3.51 | 2.27 | 3.69 | 2.78 | 1.59 | 2.69 | 4.81 | 1.62 |
| Conditional Expression (13) $0.5 < f1234/f < 7.5$ | 6.29 | 2.53 | 2.51 | 2.44 | 2.31 | 0.74 | 0.72 | 0.73 | 0.84 | 0.67 | 0.77 |
| Conditional Expression (14) $-1.2 < f56/f < -0.5$ | −0.69 | −0.76 | −0.77 | −0.84 | −0.83 | −0.72 | −0.77 | −0.73 | −0.94 | −0.63 | −0.90 |

The imaging lens composed of six constituent lenses according to the present invention features compactness and a wide field of view and meets the demand for high resolution. In particular, when it is used in a highly functional product such as a smart TV or 4K TV, or an information terminal such as a game console or PC, or an increasingly compact and low-profile mobile terminal such as a smart phone, mobile phone or PDA (Personal Digital Assistant), it enhances the performance of the product in which it is mounted.

The effects of the present invention are as follows.

According to the present invention, it is possible to provide a high-brightness compact imaging lens which delivers higher optical performance than conventional imaging lenses when it is used not only in a conventional small image sensor but also in a large image sensor, and provides a wide field of view and can correct various aberrations properly.

What is claimed is:

1. An imaging lens for a solid-state image sensor in which elements are arranged in order from an object side to an image side, comprising:
    a first lens with positive refractive power having convex surfaces on the object side and the image side;
    a second lens with negative refractive power having a concave surface on the image side and a convex surface on the object side;
    a third lens with positive refractive power as a double-sided aspheric lens having a convex surface on the object side;
    a fourth lens with positive refractive power having a convex surface on the image side;
    a fifth lens as a double-sided aspheric lens having a concave surface on the image side; and
    a sixth lens with negative refractive power having a concave surface on the image side,
    wherein the image-side surface of the sixth lens has an aspheric shape with a pole-change point in a position off an optical axis.

2. The imaging lens according to claim 1,
    wherein a conditional expression (11) below is satisfied:

$$0.8 < ih/f < 1.2 \quad (11)$$

where f: focal length of an overall optical system of the imaging lens ih: maximum image height.

3. The imaging lens according to claim 1,
wherein a conditional expression (9) below is satisfied:

$$0.65 < \Sigma d/TTL < 0.90 \quad (9)$$

where
TTL: distance on the optical axis from an object-side surface of an optical element located nearest to an object to an image plane without a filter, etc.
Σd: distance on the optical axis from the object-side surface of the first lens to the image-side surface of the sixth lens.

4. The imaging lens according to claim 3,
wherein a conditional expression (10) below is satisfied:

$$TTL/f < 1.6 \quad (10)$$

where
TTL: distance on the optical axis from an object-side surface of an optical element located nearest to an object to an image plane without a filter, etc.
f: focal length of an overall optical system of the imaging lens.

5. The imaging lens according to claim 1,
wherein:
the fifth lens is a meniscus lens with negative refractive power and the object-side surface and the image-side surface of the fifth lens have an aspheric shape with a pole-change point in a position off the optical axis; and
the sixth lens is a meniscus lens and the object-side surface of the sixth lens has an aspheric shape with a pole-change point in a position off the optical axis.

6. The imaging lens according to claim 1,
wherein a conditional expression (1) below is satisfied:

$$0.55 < f1/f < 1.7 \quad (1)$$

where
f1: focal length of the first lens
f: focal length of an overall optical system of the imaging lens.

7. The imaging lens according to claim 6,
wherein a conditional expression (2) below is satisfied:

$$-2.3 < f2/f < -0.8 \quad (2)$$

where
f2: focal length of the second lens
f: focal length of an overall optical system of the imaging lens.

8. The imaging lens according to claim 7,
wherein a conditional expression (12) below is satisfied:

$$1.3 < f3/f < 7.0 \quad (12)$$

where
f3: focal length of the third lens
f: focal length of an overall optical system of the imaging lens.

9. The imaging lens according to claim 1,
wherein conditional expressions (3) and (4) below are satisfied:

$$45 < vd1 < 80 \quad (3)$$

$$20 < vd2 < 40 \quad (4)$$

where
vd1: Abbe number of the first lens at d-ray
vd2: Abbe number of the second lens at d-ray.

10. The imaging lens according to claim 1,
wherein conditional expressions (5) to (8) below are satisfied:

$$50 < vd3 < 75 \quad (5)$$

$$50 < vd4 < 75 \quad (6)$$

$$20 < vd5 < 40 \quad (7)$$

$$50 < vd6 < 75 \quad (8)$$

where
vd3: Abbe number of the third lens at d-ray
vd4: Abbe number of the fourth lens at d-ray
vd5: Abbe number of the fifth lens at d-ray
vd6: Abbe number of the sixth lens at d-ray.

11. The imaging lens according to claim 2,
wherein a conditional expression (9) below is satisfied:

$$0.65 < \Sigma d/TTL < 0.90 \quad (9)$$

where
TTL: distance on the optical axis from an object-side surface of an optical element located nearest to an object to an image plane without a filter, etc.
Σd: distance on the optical axis from the object-side surface of the first lens to the image-side surface of the sixth lens.

12. The imaging lens according to claim 11,
wherein a conditional expression (10) below is satisfied:

$$TTL/f < 1.6 \quad (10)$$

where
TTL: distance on the optical axis from an object-side surface of an optical element located nearest to an object to an image plane without a filter, etc.
f: focal length of an overall optical system of the imaging lens.

13. The imaging lens according to claim 2,
wherein:
the fifth lens is a meniscus lens with negative refractive power and the object-side surface and the image-side surface of the fifth lens have an aspheric shape with a pole-change point in a position off the optical axis; and
the sixth lens is a meniscus lens and the object-side surface of the sixth lens has an aspheric shape with a pole-change point in a position off the optical axis.

14. The imaging lens according to claim 2,
wherein a conditional expression (1) below is satisfied:

$$0.55 < f1/f < 1.7 \quad (1)$$

where
f1: focal length of the first lens
f: focal length of an overall optical system of the imaging lens.

15. The imaging lens according to claim 14,
wherein a conditional expression (2) below is satisfied:

$$-2.3 < f2/f < -0.8 \quad (2)$$

where
f2: focal length of the second lens
f: focal length of an overall optical system of the imaging lens.

16. The imaging lens according to claim 15,
wherein a conditional expression (12) below is satisfied:

$$1.3 < f3/f < 7.0 \quad (12)$$

where
f3: focal length of the third lens
f: focal length of an overall optical system of the imaging lens.

17. The imaging lens according to claim 2,
wherein conditional expressions (3) and (4) below are satisfied:

$$45 < vd1 < 80 \tag{3}$$

$$20 < vd2 < 40 \tag{4}$$

where
vd1: Abbe number of the first lens at d-ray
vd2: Abbe number of the second lens at d-ray.

18. The imaging lens according to claim 2,
wherein conditional expressions (5) to (8) below are satisfied:

$$50 < vd3 < 75 \tag{5}$$

$$50 < vd4 < 75 \tag{6}$$

$$20 < vd5 < 40 \tag{7}$$

$$50 < vd6 < 75 \tag{8}$$

where
vd3: Abbe number of the third lens at d-ray
vd4: Abbe number of the fourth lens at d-ray
vd5: Abbe number of the fifth lens at d-ray
vd6: Abbe number of the sixth lens at d-ray.

19. The imaging lens according to claim 8,
wherein conditional expressions (5) to (8) below are satisfied:

$$50 < vd3 < 75 \tag{5}$$

$$50 < vd4 < 75 \tag{6}$$

$$20 < vd5 < 40 \tag{7}$$

$$50 < vd6 < 75 \tag{8}$$

where
vd3: Abbe number of the third lens at d-ray
vd4: Abbe number of the fourth lens at d-ray
vd5: Abbe number of the fifth lens at d-ray
vd6: Abbe number of the sixth lens at d-ray.

20. The imaging lens according to claim 16,
wherein conditional expressions (5) to (8) below are satisfied:

$$50 < vd3 < 75 \tag{5}$$

$$50 < vd4 < 75 \tag{6}$$

$$20 < vd5 < 40 \tag{7}$$

$$50 < vd6 < 75 \tag{8}$$

where
vd3: Abbe number of the third lens at d-ray
vd4: Abbe number of the fourth lens at d-ray
vd5: Abbe number of the fifth lens at d-ray
vd6: Abbe number of the sixth lens at d-ray.

* * * * *